US012681547B2

(12) United States Patent
Rajwan et al.

(10) Patent No.: US 12,681,547 B2
(45) Date of Patent: Jul. 14, 2026

(54) ASYMMETRICAL POWER SHARING

(71) Applicant: Apple Inc., Cupertino, CA (US)

(72) Inventors: Doron Rajwan, Rishon LeZion (IL); Jamie L. Langlinais, Los Gatos, CA (US); Kevin I. Park, Oakland, CA (US)

(73) Assignee: Apple Inc., Cupertino, CA (US)

( * ) Notice: Subject to any disclaimer, the term of this patent is extended or adjusted under 35 U.S.C. 154(b) by 123 days.

(21) Appl. No.: 18/392,770

(22) Filed: Dec. 21, 2023

(65) Prior Publication Data

US 2025/0103121 A1     Mar. 27, 2025

Related U.S. Application Data

(60) Provisional application No. 63/584,780, filed on Sep. 22, 2023, provisional application No. 63/584,774, filed on Sep. 22, 2023.

(51) Int. Cl.
*G06F 1/26* (2006.01)
*G06F 1/3206* (2019.01)

(52) U.S. Cl.
CPC ............ *G06F 1/263* (2013.01); *G06F 1/3206* (2013.01)

(58) Field of Classification Search
CPC ............................... G06F 1/263; G06F 1/3206
See application file for complete search history.

(56) References Cited

U.S. PATENT DOCUMENTS

| | | | |
|---|---|---|---|
| 8,984,313 B2 * | 3/2015 | Bhandaru | G06F 1/26 |
| | | | 713/320 |
| 9,477,279 B1 * | 10/2016 | Piszczek | G06F 1/206 |
| 10,452,117 B1 * | 10/2019 | Becker | G06F 1/3243 |
| 10,860,083 B2 | 12/2020 | Degalahal et al. | |
| 10,880,125 B2 | 12/2020 | Mather et al. | |
| 2009/0158061 A1 | 6/2009 | Schmitz et al. | |

(Continued)

FOREIGN PATENT DOCUMENTS

CN        106537348 B       4/2020

OTHER PUBLICATIONS

International Search Report and Written Opinion in PCT Appl. No. PCT/US2024/047058 mailed Dec. 20, 2024, 9 pages.

*Primary Examiner* — Jaweed A Abbaszadeh
*Assistant Examiner* — Ayman Fatima
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to managing power allocation for component circuits coupled to one or more power sources. A system can include a first integrated circuit die that is indirectly coupled to a second integrated circuit die through a set of intervening integrated circuit dies. The system can include a first power source configured to supply power to component circuits of the first and second integrated circuit dies. The first integrated circuit may allocate, to a first set of component circuits of the first integrated circuit die, a first set of power credits for obtaining power from the first power source. The first integrated circuit may send a second set of power credits to the second integrated circuit die through the set of intervening integrated circuit dies without the set of intervening integrated circuit dies using the second set of power credits to obtain power from the first power source.

18 Claims, 15 Drawing Sheets

(56)     References Cited

U.S. PATENT DOCUMENTS

| | | | |
|---|---|---|---|
| 2012/0023345 A1* | 1/2012 | Naffziger | G06F 1/324 |
| | | | 713/340 |
| 2014/0149760 A1* | 5/2014 | Drake | G06F 9/5094 |
| | | | 713/320 |
| 2015/0067356 A1* | 3/2015 | Trichy Ravi | G06F 1/324 |
| | | | 713/300 |
| 2019/0280895 A1* | 9/2019 | Mather | H04L 12/40045 |
| 2020/0209944 A1 | 7/2020 | Palmer | |
| 2021/0311537 A1* | 10/2021 | Srinivasan | H01L 25/0652 |
| 2021/0405722 A1 | 12/2021 | Sadowski et al. | |
| 2023/0101217 A1 | 3/2023 | Rajwan et al. | |
| 2023/0142337 A1 | 5/2023 | Jenne et al. | |
| 2023/0176644 A1 | 6/2023 | Das et al. | |

* cited by examiner

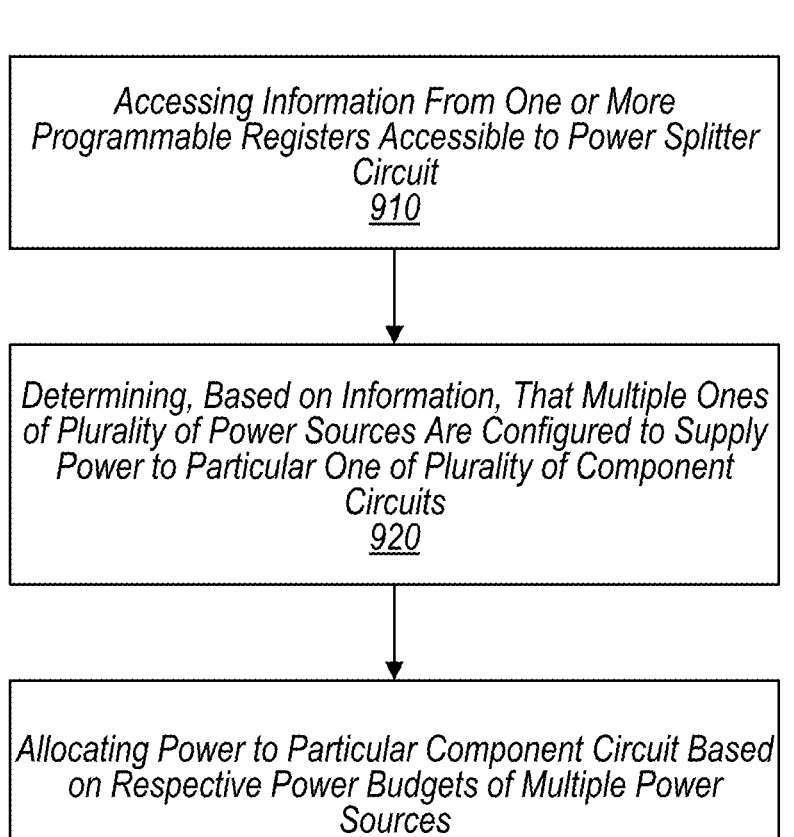

*900*

Accessing Information From One or More Programmable Registers Accessible to Power Splitter Circuit
910

Determining, Based on Information, That Multiple Ones of Plurality of Power Sources Are Configured to Supply Power to Particular One of Plurality of Component Circuits
920

Allocating Power to Particular Component Circuit Based on Respective Power Budgets of Multiple Power Sources
930

Accessing Mapping From One or More Programmable
Registers
1010

Allocating Power to Given Component Circuit of
Plurality of Component Circuits Based on One or More
Power Budgets of One or More Power Sources Mapped
to Given Component Circuit as Indicated by Mapping
1020

*1100*

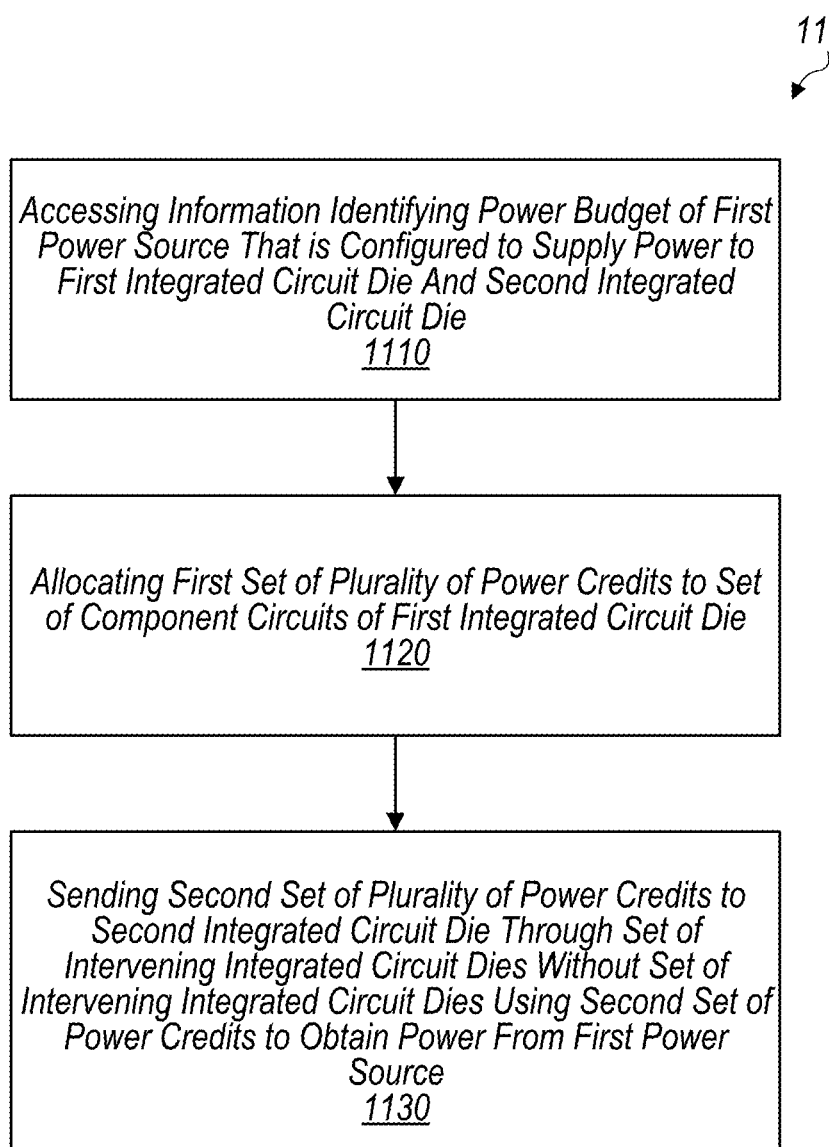

*Accessing Information Identifying Power Budget of First Power Source That is Configured to Supply Power to First Integrated Circuit Die And Second Integrated Circuit Die*
*1110*

*Allocating First Set of Plurality of Power Credits to Set of Component Circuits of First Integrated Circuit Die*
*1120*

*Sending Second Set of Plurality of Power Credits to Second Integrated Circuit Die Through Set of Intervening Integrated Circuit Dies Without Set of Intervening Integrated Circuit Dies Using Second Set of Power Credits to Obtain Power From First Power Source*
*1130*

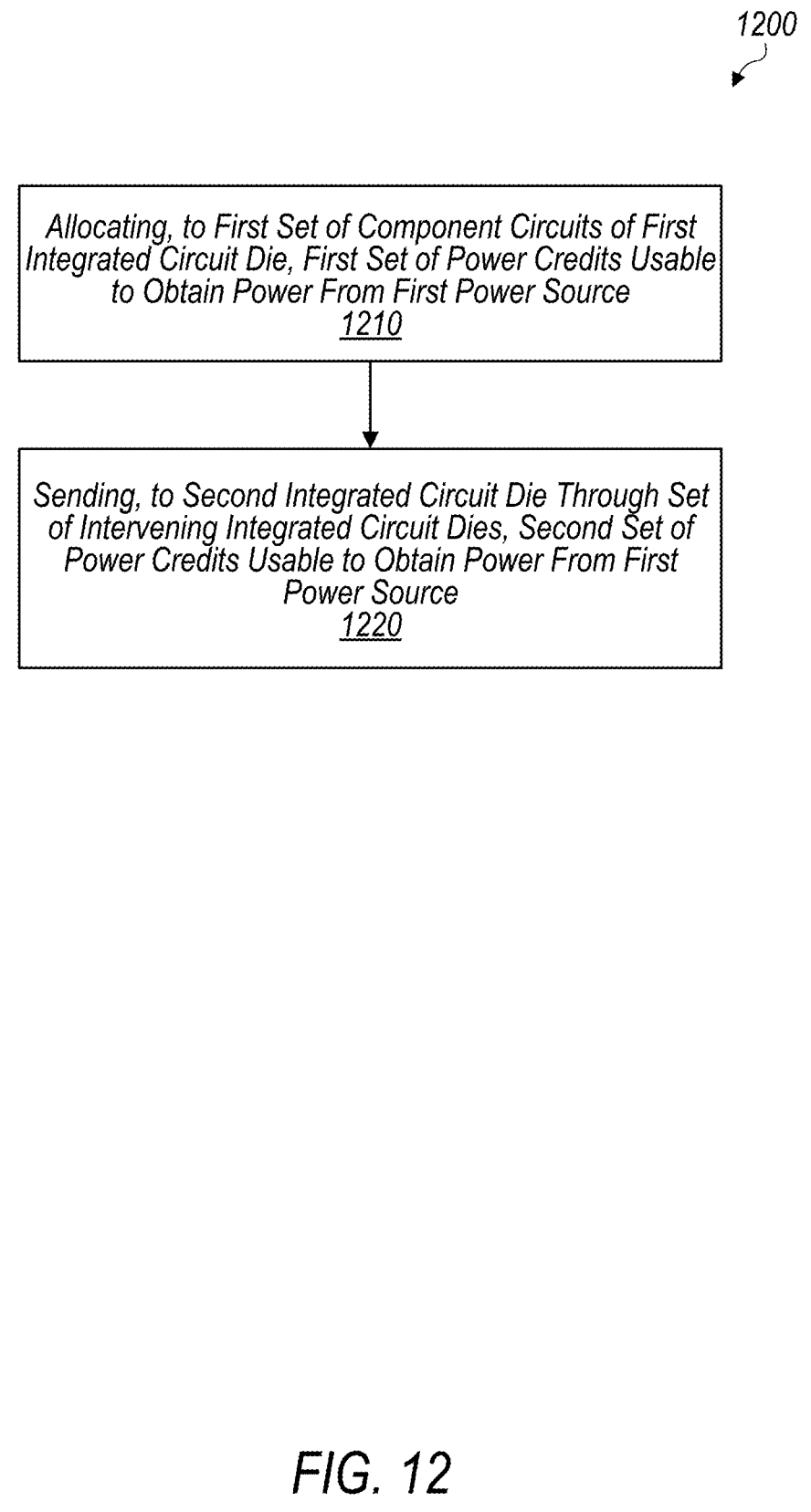

Allocating, to First Set of Component Circuits of First Integrated Circuit Die, First Set of Power Credits Usable to Obtain Power From First Power Source
1210

Sending, to Second Integrated Circuit Die Through Set of Intervening Integrated Circuit Dies, Second Set of Power Credits Usable to Obtain Power From First Power Source
1220

*FIG. 12*

ASYMMETRICAL POWER SHARING

PRIORITY CLAIM

The present application claims priority to U.S. Provisional Appl. No. 63/584,774, filed Sep. 22, 2023, and U.S. Provisional Appl. No. 63/584,780, filed Sep. 22, 2023; the disclosures of which are hereby incorporated by reference herein in their entireties. To the extent that the incorporated material conflicts with the material expressly set forth herein, the expressly set forth material controls.

BACKGROUND

Technical Field

This disclosure relates generally to integrated circuits and, more specifically, to various mechanisms to manage power allocation for component circuits coupled to power sources.

Description of the Related Art

Modern computer systems often include a system on a chip (SOC) that integrates many component circuits (e.g., a central processing unit (CPU), a graphics processing unit (GPU), etc.) onto an integrated circuit die. Those component circuits can be coupled to a power source, such as a battery, that supplies power to them to facilitate their functionality. SOCs often have multiple independent voltage domains, which can concurrently have different supply voltages and can be presenting different loads (e.g., current drawn at the given load). As SOCs continue to increase in complexity and performance, the complexity to deliver power stably and reliably to the component circuits of those SOCs also increases. There is also a growing trend towards the use of multiple dies, or chiplets, that are integrated into a single package instead of using a large monolithic SOC die.

BRIEF DESCRIPTION OF THE DRAWINGS

FIGS. 9 and 10 are flow diagrams illustrating example methods that relate to allocating power to component circuits based on a mapping, according to some embodiments.

FIGS. 11 and 12 are flow diagrams illustrating example methods that relate to sharing power credits through a set of intervening dies, according to some embodiments.

DETAILED DESCRIPTION

Figure 1:
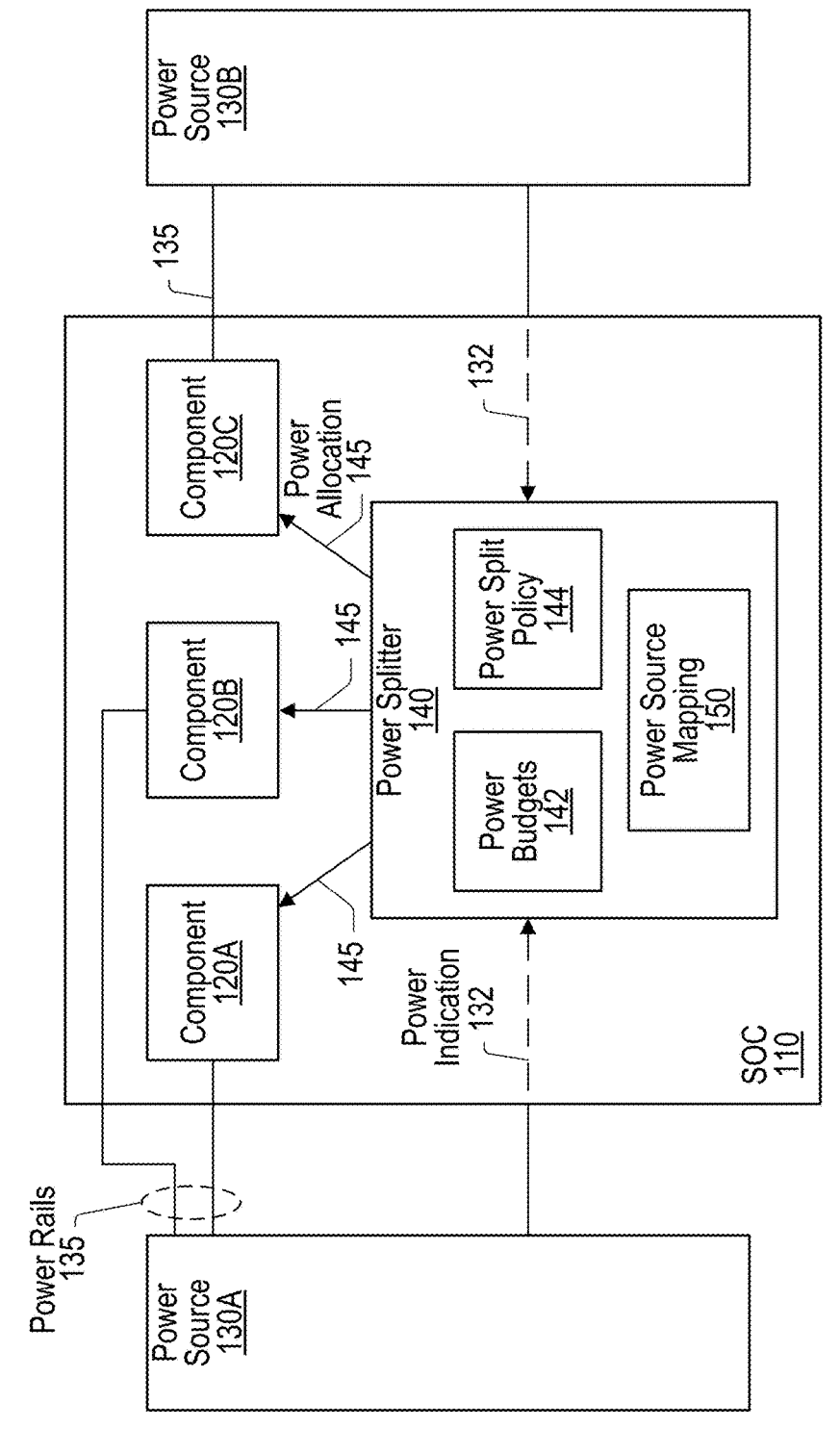
FIG. 1 is a block diagram illustrating example elements of a system comprising an SOC and multiple power sources that supply power to component circuits of that SOC, according to some embodiments.

An SOC can include various component circuits that are coupled to a power source that delivers power to them. In some designs, those component circuits are also coupled to a power splitter circuit that divides power from that power source among those component circuits. In particular, the suppliable power of the power source may be represented by power credits that form a power budget. The power splitter circuit can divide the power credits among the various component circuits according to a power split policy, and the component circuits obtain power from the power source based on their received power credits. Power configurations, however, are becoming more complex with multiple power sources that have different power limits and rails to which they supply power. For example, a system may include two power sources: one that supplies power to a first set of component circuits managed by a power splitter circuit and another that supplies power to a second set of component circuits managed also by that power splitter circuit. Further, different products (e.g., laptops, tablets, mobile phones, etc.) can have different power configurations (e.g., different numbers of power sources), and the distribution of the power rails can also be different between those products. In many cases, these different power configurations in which a power splitter circuit is placed change during development or are unknown to the design team responsible for managing power within SOCs. This disclosure addresses, among other things, the problem of how to allocate power in device configurations having multiple power sources, where the device configurations can also have different power configurations (e.g., different types and numbers of power sources).

There is also a growing trend towards the use of multiple dies instead of the use of one large monolithic SOC die. In many cases, dies in a multi-die configuration are symmetrically similar to each other and are directly coupled. As used herein, the term "symmetrically similar dies" refers to dies that are designed to include the same component circuits, although the dies can be physically different due to manufacturing defects. The layout of the component circuits of symmetrically similar dies can also be different. As an example, symmetrically similar dies that are co-packaged together can have their component circuit layouts mirror each other. Dies that are asymmetrical to each other do not include the same component circuits. For example, a die that includes GPU processors but no CPU processors is asymmetrical to a die that includes CPU processors but no GPU processors.

Dies can share a common power source that supplies power to component circuits in those dies, and thus they may share power. If there is leftover power allocation in one die, then the die may send power credits corresponding to the remaining allocation to the symmetrically similar die directly coupled to it. But multi-die configurations are shifting to an asymmetric "chiplet" strategy in which the dies/chiplets are laid out in asymmetrical manner. As used herein, dies being described as laid out in an asymmetrical manner refers to at least two symmetrically similar dies being separated by one or more intervening dies that are asymmetrical with respect to the symmetrically similar dies. For example, the layout "CPU die<->GPU die<->GPU die<->CPU die" is asymmetrical because the CPU dies are separated by intervening GPU dies that are asymmetrical with respect to those CPU dies. Dies that are separated by one or more intervening dies can share a common power source that is not coupled to those intervening dies—e.g., the CPU dies of the previous example can share a power source that is not used by the GPU dies. It may be desirable for the dies coupled to the same power source to share power credits, even when there are intervening dies that are not coupled to that power source. This disclosure further addresses, among other things, the problem of how to share power credits between dies when there are intervening dies that do not use those power credits.

In various embodiments described below, a system comprises multiple power sources, component circuits, and a power splitter circuit configured to allocate power to the component circuits from the power sources. Those power sources supply power to respective sets of those component circuits, and there may be overlap between those sets. In various embodiments, the power splitter circuit is coupled to one or more programmable registers configured to store a mapping that indicates which power sources supply power to a given component circuit that is managed by the power splitter circuit. The mapping that is stored in the programmable registers can be different between systems having different power configurations, and thus through the mapping, the power splitter circuit can determine its system's particular configuration of power sources to component circuits. Accordingly, the power splitter circuit may allocate power to a given component circuit based on the power budget(s) of the power source(s) that are mapped to that component circuit as indicated by the mapping. In some cases, a component circuit can obtain power from multiple power sources. Consequently, in various embodiments, the power splitter circuit allocates power to that component based on the most limiting power source that supplies power to the component. As used herein, the term "most limiting power source" refers to the power source(s) whose suppliable power to a component is the least among multiple power sources. For example, if a first power source can supply 10 watts to a component and a second power source can supply 20 watts, then the first power source is the most limiting power source between those power sources for that component. There can be multiple power sources that are referred to as the most limiting power source for a component if they supply the same amount of power that corresponds to the least amount of power. Continuing the prior example, if a third power source can supply 10 watts to the component, then the first and third power source are considered the most limiting power sources. For the power source(s) that allocate more power than the most limiting power source(s), in some embodiments, the excess amount is added to the available power budget of their next power allocation cycle.

In various embodiments, the system comprises multiple dies that are coupled together and can be laid out in an asymmetrical manner. As such, a first and second die can be indirectly coupled to each other through one or more intervening dies. At least one of the power sources of the system may be configured to supply power to component circuits of the first and second dies. The first and second dies may obtain power from the power source based on power credits that are actively shared between them. As used herein, the term "actively shared" with respect to power credits refers to sharing power credits between components (e.g., dies) that results in a change to an initial amount of power credits allocated to those components. For example, a power source may supply power represented by a hundred power credits, and two dies coupled to the power source may each be initially allocated fifty power credits. If one of the dies sends, e.g., ten power credits to the other die so that the other die's allocation changes to sixty power credits, then the power credits are considered to be actively shared. Actively shared power credits stand in contrast to "passively shared" power credits, which refers to components receiving an allocation of a power source's pool of power credits without sending any of their power credits to another component. Thus, if dies do not physically send any power credits to each other but share the same power source, then they are considered to passively share the pool of power credits of that power source and thus the power credits are passively shared. In the case of actively shared power credits, a first die may send a set of power credits for a power source to a second die through one or more intervening dies without those intervening dies using the power credits to obtain power from the power source.

These techniques may be advantageous over prior approaches as these techniques allow for a power splitter to support different systems that have different power configurations. For example, by using a mapping between component circuits and power sources and storing it in programmable registers, the same power splitter circuitry can be used in different systems that have different power configurations. Based on the mapping, the power splitter circuitry is able to allocate power to the various components of a given system from the various power sources of that given system. Furthermore, by implementing a mechanism to enable dies to send power credits through any intervening dies, symmetrically similar dies are able to share power credits even if they are not directly coupled.

Turning now to FIG. 1, a block diagram of a system 100 is shown. System 100 includes a set of components that may be implemented via hardware, or a combination of hardware and software. In various embodiments, system 100 is any hardware-based system such as a desktop computer, a laptop computer, a tablet computer, a cellular or mobile phone, etc. Examples of different types of systems that can correspond to system 100 are discussed in more detail with respect to FIG. 14. In the illustrated embodiment, system 100 comprises an SOC 110 and power sources 130A-B that supply power to the circuits of SOC 110 via power rails 135. As shown, SOC 110 includes components 120A-C and a power splitter 140 coupled to those components 120. Also as shown, components 120A-B are coupled to power source 130A, component 120C is coupled to power source 130B, and power splitter 140 includes power budgets 142, a power split policy 144, and a power source mapping 150. System 100 can be implemented differently than shown. As an example, SOC 110 may comprise multiple dies that are coupled together, as discussed in more detail with respect to FIGS. 5-8. It is noted that the number of components of system 100 (and also the number of subcomponents for those shown in FIG. 1, such as power splitter 140) may vary between embodiments. Accordingly, there can be more or fewer of each component or subcomponent than the number shown in FIG. 1.

SOC 110, in various embodiments, integrates many components (e.g., components 120, power splitter 140, etc.) onto a single semiconductor substrate as an integrated circuit chip, and hence is referred to as a system on a chip. In some embodiments, however, the components are implemented on two or more discrete chips in system 100. As discussed with respect to FIGS. 4-8 for example, system 100 can include multiple dies/chiplets that are coupled together as an integrated circuit assembly. For the ease of discussion, various embodiments in this disclosure are described as being implemented using one or more SOCs. But it is to be understood any disclosed SOC can also be implemented using a chiplet-based architecture. As such, wherever the term "SOC" appears in this disclosure, those references are intended to suggest alternate embodiments in which the same functionality is implemented via a less monolithic architecture such as via multiple dies/chiplets that can be included in a single integrated assembly package in some embodiments.

Architectures in which there are multiple dies are to be understood to encompass both homogeneous designs (in which each die includes identical or almost identical functionality) and heterogeneous designs (in which the functionality of each die diverges more considerably). This disclosure also contemplates embodiments in which the functionality of multiple SoCs are implemented using different levels of discreteness. For example, the functionality of a first system could be implemented on a single IC, while the functionality of a second system (which could be the same or different than the first system) could be implemented using a number of co-packaged dies/chiplets.

Components 120, in various embodiments, include any hardware components that may be included in a system. Examples of components 120 include central processing units (CPUs), graphics processing units (GPUs), memory controllers, peripheral component circuits (or more briefly, peripherals), etc. Peripherals may include display controllers, image signal processors, audio processors, video or audio encoder/decoder circuits, bridges to external interconnects of various types, input/output devices, etc. A given component 120 may include a power control circuit that implements a set of power management mechanisms within that component 120 as a whole. That is, a component 120 may be an entity that is power managed as a unit by a power control circuit that may engage power management mechanisms to reduce power consumption and possibly reduce performance. In various embodiments, the power control circuit is coupled to a rate control circuit that manages power consumption by providing, e.g., inputs requesting reduced power consumption based on indications of allocated power. A rate control circuit is discussed in more detail with respect to FIG. 2.

While not depicted, in various embodiments, SOC 110 comprises multiple independent power domains, which can concurrently have different supply voltages and can be presenting different loads (e.g., current drawn at the given load). A given component 120 may be located in a single power domain, and more than one component 120 may be located in a given power domain. For example, component 120A may be in a first power domain and components 120B-C may be a second power domain. Power splitter 140 is also in a power domain, which might be shared with one or more components 120 or separate. A power domain may be independent if it is controlled separately from the other power domains. For example, an independent power domain may have dedicated voltage inputs to the system, which may be controlled, e.g., by a separate voltage controller. Consequently, power management within that power domain may be sufficient to protect the stability of the voltage controller that supplies power to that power domain. However, system-wide power management may be used to manage power across the power domains, and thus may protect higher-level voltage controllers in the system.

Power sources 130, in various embodiments, are circuits that are configured to supply power to SOC 110 and other components that can be included in system 100, such as a memory (e.g., dynamic random-access memory). For example, a power source 130 may be configured to produce one or more supply voltages to power SOC 110 via power rails 135 and one or more supply voltages to power other components located in system 100. Examples of power sources 130 include, but are not limited to, a coupled inductor voltage regulator (CLVR), an electronic voltage regulator (EVR), and a battery. Different combinations of power source types may be coupled to SOC 110. As an example, power source 130A may be a CLVR while power source 130B is an EVR in one configuration of system 100 while, in another configuration of system 100, power sources 130A and 130B may both be CLVRs.

In various embodiments, a multi-level power delivery network is provided. In a multi-level power delivery network, a first level of voltage regulator(s) may supply a first amount of load current to a second level of voltage regulators. The second level of voltage regulators may deliver power to the various independent power networks in system 100. Various consumers (e.g., CPUs, GPUs, peripherals, etc.) may be located within those independent power domains, as discussed above. Local power estimation and power control within the power domains may be used to avoid overloading a given second level voltage regulator. But providing a first level regulator that can supply the second level regulators when they are concurrently at their peak loads would not be cost effective, since such loads will likely be rare. Therefore, another power management mechanism may be implemented (e.g., by power splitter 140) to protect the first level voltage regulator(s).

Power splitter 140 (or, power splitter circuit 140), in various embodiments, is circuitry configured to allocate suppliable power to components 120 from the power budget(s) 142 that correspond to the power source(s) 130 supplying power to those components. A power budget 142, in various embodiments, is based on the capability of the corresponding voltage controller that supplies power to system 100 (e.g., a first level voltage controller, such as a CLVR, that supplies second-level voltage controllers, which in turn supply power domains). The available power (e.g., the maximum current reliably supplied by a first level voltage controller multiplied by the voltage nominally supplied by that controller) may be represented in the form of power credits, where a given credit represents a specified amount of power. Accordingly, in various embodiments, a power budget 142 comprises a pool of power credits that collectively represent the total available power of a corresponding power source 130. A given power source 130 can provide a power indication 132 to power splitter 140 that may indicate that source's available power or a certain number of power credits. As discussed in greater detail with respect to FIG. 3, power splitter 140 can generate power budgets 142 based on power indications 132 received from power sources 130 of system 100. In various embodiments, power splitter 140 allocates power to components 120 by issuing indications of the allocated power (e.g., power allocations 145 that specify a number of power credits) to those components (e.g., to their respective rate control circuits). Components 120 manage their respective power consumption based on their indication of allocated power (i.e., the power allocation 145 that they receive). Power credits are discussed in more detail with respect to FIG. 2

In various embodiments, power splitter 140 is program-mable with a power split policy 144, and divides power budget(s) 142 based on that policy. In particular, compo-nents 120 may be divided into groups in any desired fashion. For example, components 120 might be grouped by type (e.g. CPUs, GPUs, peripherals, etc.), and power split policy 144 may specify a power allocation by type (e.g., various percentages of a given power budget 142 to various types). As an example, power split policy 144 may specify that a CPU group (e.g., components 120A-B) receives 40% of the suppliable power of power source 130A and a GPU group (e.g., component 120C) receives the remaining 60% of the suppliable power. Various subsets of peripherals may be types of components, such as audio peripherals, video peripherals, networking peripherals, storage peripherals, etc. But in another embodiment, components 120 can be grouped by power domain. While the same power split policy 144 may be used for both power sources 130A-B, in some embodiments, each power source 130 is associated with a respective power split policy 144. The type of grouping of the respective power split policy 144 may be based on the types of components 120 coupled to the corresponding power source 130—e.g., if a particular power source 130 is coupled to CPU components and peripherals components, then its corresponding power split policy 144 may be based on a ratio associated with CPUs and periph-erals.

In various embodiments, power splitter 140 is also pro-grammable with a power source mapping 150 that specifies which components 120 are coupled to which power sources 130 of system 100. As depicted, for example, components 120A-B are coupled to power source 130A and component 120C is coupled to power source 130B. Thus, for the illustrated embodiment, power source mapping 150 maps components 120A-B to power source 130A and component 120C to power source 130B. As previously explained, different systems 100 can have different power configura-tions (examples of which are discussed with respect to FIG. 4) and thus power source mapping 150 can be different between different systems 100. Accordingly, based on a given power source mapping 150, power splitter 140 can determine which power sources 130 of its system 100 are configured to supply power to which components 120 man-aged by power splitter 140. Also, in some embodiments, power source mapping 150 maps other components of system 100 that are not managed by power splitter 140 (e.g., a memory, such as a dynamic random access memory) to power sources 130 of system 100.

When allocating power to components 120, in various embodiments, power splitter 140 accesses power source mapping 150 from internal programmable registers. Power budgets 142, power split policy 144, and power source mapping 150 may be stored during particular stages of operation of system 100 (e.g., firmware of system 100 may store power split policy 144 and power source mapping 150 during a boot process of the system, controlling software may store power budgets 142 during use of the system, etc.). Based on power source mapping 150, power splitter 140 may allocate power to a given component 120 based on one or more power budgets 142 of one or more power sources 130 mapped to that given component 120. In the illustrated embodiment for example, power splitter 140 may allocate power to component 120A based on a power budget 142 of power source 130A (since component 120A is coupled to power source 130A) and power split policy 144. In some cases, power splitter 140 may determine, based on power source mapping 150, that different power sources 130 supply power to a component 120, and thus power splitter 140 may allocate power to that component 120 based on respective power budgets 142 of those power sources. As discussed in more detail with respect to FIG. 3, power splitter 140 may allocate power to that component 120 based on the most limiting power source 130.

Figure 2:
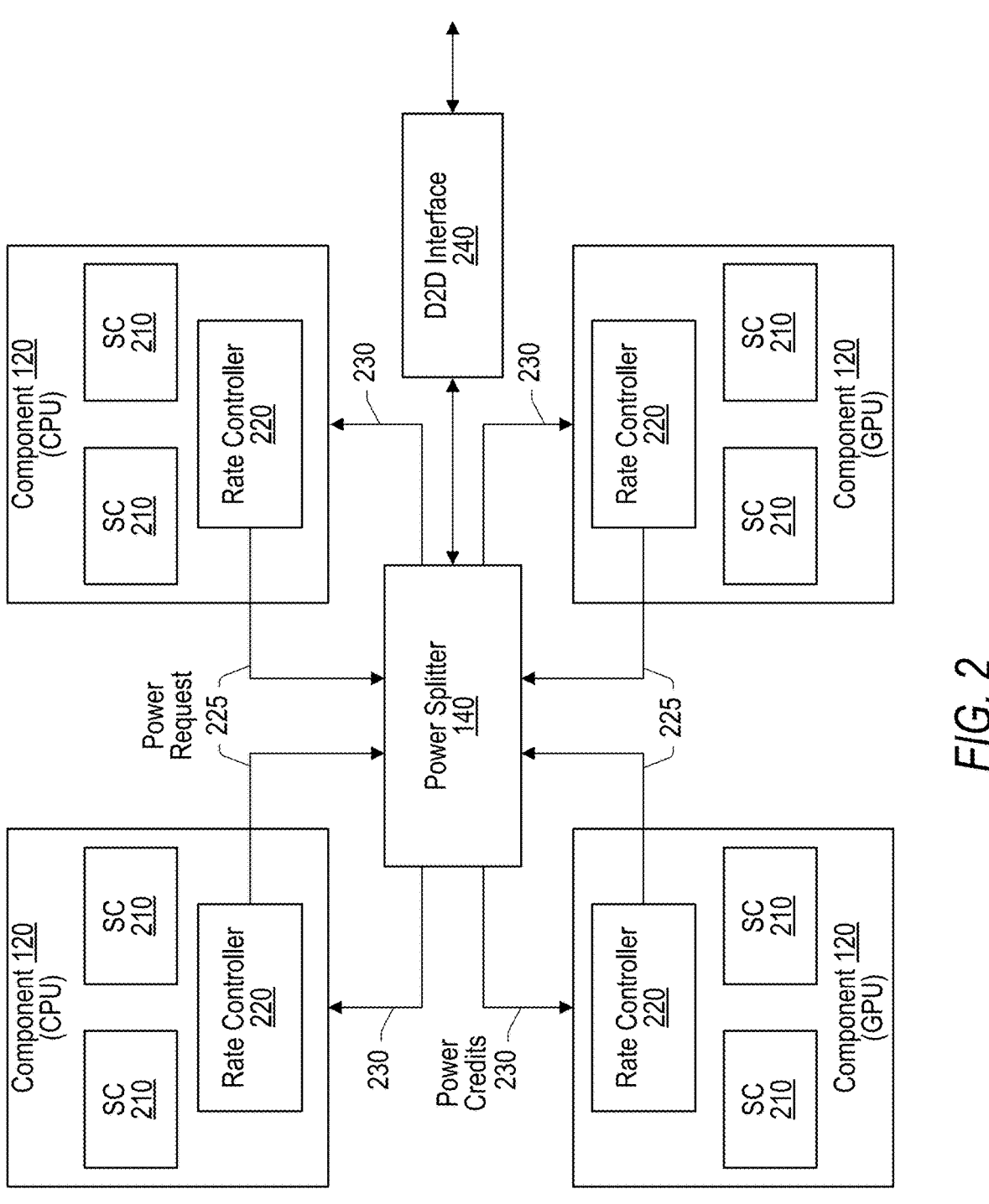
FIG. 2 is a block diagram illustrating example elements of component circuits that are coupled to a power splitter circuit, according to some embodiments.

Turning now to FIG. 2, a block diagram of one embodi-ment of a set of components 120 coupled to a power splitter 140 is shown. In the illustrated embodiment, components 120 each include a set of subcomponents 210 (SCs 210) and a rate controller circuit 220. Also as shown, power splitter 140 is coupled to a die-to-die (D2D) interface 240, and two of the four illustrated components 120 are GPU components and the remaining two are CPU components-different com-binations of components 120 may be coupled to power splitter 140, such as a combination of CPU components and peripheral components.

As explained, power splitter 140 allocates power to com-ponents 120 and communicates respective indications of the allocated power to those components 120. In particular, in various embodiments, power splitter 140 provides, to a rate controller 220 of a component 120, one or more power credits 230, where a credit 230 represents a defined amount of power. In the cases of multiple power sources 130 supplying power to a particular component 120, power splitter 140 may provide, to that component's rate controller 220, power credits 230 for each of those power sources 130. As discussed in more detail with respect to FIG. 3, power splitter 140 may provide a number of power credits 230 that is based on the most limiting power source 130 of the power sources 130 coupled to a component 120. By measuring power (i.e., watts) in terms of credits 230, power splitter 140 can provide indications of the allocated amounts in a com-mon format that translates across different power domains that can be operating at different voltages at a given point in time. Based on the power credits 230 that are provided to it, a rate controller 220 may manage the power consumption of its component 120.

To manage power consumption, in some embodiments, a rate controller 220 interfaces with a power control circuit included in its component 120. Generally, a power control circuit may implement a set of power management mecha-nisms, each of which is designed to reduce power consump-tion in its component 120 when that mechanism is engaged, compared to when it is not engaged. As an example, if a component 120 comprises multiple pipelines, the power management mechanism may reduce the number of pipe-lines that are actively in use, such that operations performed by that component 120 are performed in a reduced number of pipelines and power is conserved through the inactivity of one or more of those pipelines. Another power management mechanism may include reducing the issue rate of opera-tions into a pipeline, thus introducing "bubbles" in the pipeline in which inactivity occurs. Another power manage-ment mechanism may include periodic stalling of a pipeline, or temporarily reducing the frequency of the clocks supplied to the pipeline. Still further, clock manipulation techniques may be used such as clock dithering, clock dividers, and clock throttling.

In various cases, a component 120 may have subcomponent circuits 210 (more briefly "subcomponents" 210). Those subcomponents 210 may be relatively independent, such that the power control circuit of that component 120 may disable one or more of the subcomponents 210 without preventing operation of the remaining components. For example, a CPU processor cluster may have a plurality of CPU processors, and one or more of those CPU processors may be disabled (e.g., stalled, clock gated, or even power gated) without preventing the remaining CPU processors from continuing to execute program instructions. Also, in a GPU, there may be multiple symmetrical units, such as shaders, rasterizers, etc., that are subcomponents 210 that can be disabled. Accordingly, in a component 120 having subcomponent circuits 210, the power control circuit may implement power management mechanisms to disable or reduce the performance of a subset of the subcomponents 210 while permitting other subcomponents 210 to operate unhindered.

A given power control circuit may apply one or more of its various power management mechanisms based on input from its corresponding rate controller 220. The rate controller 220 may determine what input to provide to the power control circuit based on the number of power credits 230 received for a power allocation cycle. For example, if a rate controller 220 receives less power credits 230 than a number needed for full operation of its component 120, then the rate controller 220 might provide a particular input to the corresponding power control circuit that causes that power control circuit to reduce the number of pipelines that are actively in use, for example. In various embodiments, the inputs provided by a rate controller 220 to a power control circuit indicate different levels of aggression that the power control circuit should apply to reduce power consumption. For more aggressive cases, the power control circuit may apply multiple power management mechanisms to the reduce power. As the number of power credits 230 increases (e.g., returns to an amount associated with normal operation), the power control circuit may reduce the number of power management mechanisms being applied or it may stop applying the power management mechanisms altogether.

As shown, rate controllers 220 are configured to generate and send power requests 225 to power splitter 140. A power request 225 may specify a requested amount of power or a floor value that represents a minimum amount of power to ensure correct operation of the associated component 120. In various embodiments, a rate controller 220 generates a power request 225 based on a power estimate received from a power estimation circuit (included in the associated component 120) as well as previously allocated and consumed power—the power estimate can be expressed in terms of power credits 230. The power estimate may be based on current and/or expected processing demand on subcomponents 210 of the associated component 120. Thus, the power requested by a component 120 can vary between different power allocation cycles, and also the power allocated to the component 120 can vary based on the demands of the other components 120 that are coupled to power splitter 140. In various embodiments, power splitter 140 ensures that components 120 receive an allocation of power at least equal to the minimum of their respective floor values to ensure their correct operation. The remaining power budget (leftover from meeting the minimum floor values) of a power source 130 may then be allocated based on power split policy 144 and the respective power requests 225.

As mentioned, system 100 may be implemented on a single semiconductor substrate (a chip) or on multiple chips coupled together. The chips may be coupled via D2D interface 240, and thus D2D interface 240 may enable a given power splitter 140 to communicate with power splitters 140 on other chips. In particular, multiple chips may share a power source 130 (e.g., CLVR). Thus, a power splitter 140 may share power credits 230 (that correspond to suppliable power of that power source 130) that are unused by its local components 120 with other power splitters 140 on the other dies/chips and/or may receive power credits 230 from the other power splitters 140 for use by its components 120. A discussion of sharing power credits 230 between multiple dies is provided with respect to FIGS. 5-8.

Figure 3:
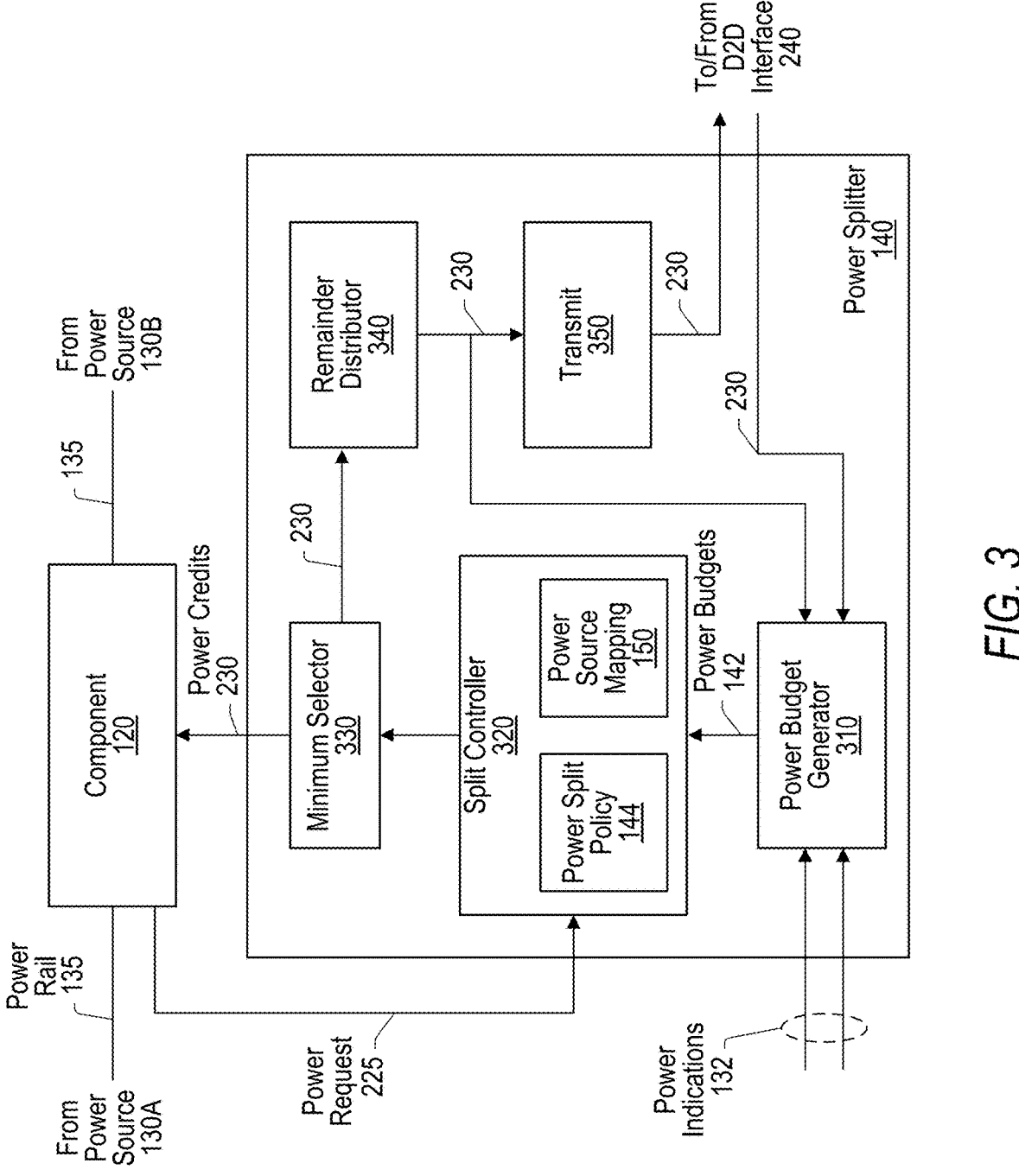
FIG. 3 is a block diagram illustrating example elements of a power splitter circuit that allocates power to a component circuit, according to some embodiments.

Turning now to FIG. 3, a block diagram of one embodiment of a power splitter 140 is shown. In the illustrated embodiments, power splitter 140 is coupled to a component 120 and comprises a power budget generator 310, a splitter controller 320, a minimum selector 330, a remainder distributor 340, and a transmit circuit 350. As further shown, splitter controller 320 includes a power split policy 144 and a power source mapping 150. Also as shown, component 120 is coupled to power sources 130A and 130B.

As explained, power splitter 140 may allocate power to components 120 based on one or more power budgets 142 that correspond to one or more power sources 130. Power budget generator 310, in various embodiments, includes circuitry that is configured to generate power budgets 142 for power sources 130 of system 100 or only those power sources 130 associated with the generator's power splitter 140. In order to generate power budgets 142, power budget generator 310 receives power indications 132 that provide information indicating the amount of available power from the various power sources 130. For example, a power manager circuit may be a component 120 that indicates the amount of available power based on various power states managed by that power manager circuit, as well as from inputs of the power sources 130 and/or other parts of the external power management unit. The inputs may provide information regarding voltage regulators' loads, if any undervoltage events are detected due to overload of those voltage regulators, etc.

Based on the received power indication(s) 132 and programmable configuration data, in various embodiments, power budget generator 310 generates, for each relevant power source 130, an indication of an available amount of power of that power source 130 that is represented as a number of power credits 230 in which each power credit represents a specific amount of power (a number of watts). A power budget 142 may be based on various programmable values (e.g., an initial budget) that may be modified based on received power indication(s) 132. For example, a power indication 132 might indicate that power reduction is requested by external (to the integrated circuit) hardware such as the power management unit, even though the on-system hardware hasn't detected an issue yet. Power budget generator 310 may thus reduce the power budget 142 for the associated power source 130 in those cases. Further, a power budget 142 may be adjusted based on unused power from a previous power cycle and/or power credits 230 shared from other dies. For example, as discussed further below, the most limiting power source 130 relative to a given component 120 may determine the power allocation provided to that component 120. If multiple power sources 130 supply power to that given component 120, then the excess power from the ones supplying more than the most limiting power source

130 may be added to corresponding power budgets 142 in the next power allocation cycle.

In some embodiments, a first level voltage regulator (a power source 130) can operate with fewer than a maximum number of phases active (e.g., a single-phase mode), and power budget generator 310 may reduce that voltage regulator's power budget 142 based on the load current that the reduced number of phases can support (e.g., a reduced budget can be provided to correspond to the reduced number of phases and power budget generator 310 can switch to the reduced budget based on an input indicating the reduced phase mode is active). In various embodiments, the initial power budget of a power source 130 may be programmed to different values by controlling software during use (e.g., within a predefined range that has been tested and is known to be safe). The controlling software may modify that power budget 142 to reduce or eliminate the occurrence of power indications 132 that cause budget reductions, which may improve overall efficiency.

Power budget generator 310 may further consider any dynamic random access memory (DRAM) rails coupled to a power source 130 for which power budget generator 310 produces a power budget 142. While, in some embodiments, there is no direct power control mechanisms for the DRAM, including the DRAM in the power allocation can allow for protection of power sources 130 (e.g., the battery) that also supply power to the DRAM. Accordingly, power budget generator 310 may access power source mapping 150 to determine whether a particular power source 130 supplies power to the DRAM.

In various embodiments, power budget generator 310 produces a power budget 142 for each power source 130 associated with its power splitter 140. Different power sources 130 can provide different amounts of available power and thus power budgets 142 can include different amounts of power credits 230. For example, the power budget 142 for power source 130A may be a hundred power credits 230 in a particular power allocation cycle while the power budget 142 for power source 130B is a fifty power credits 230 in the same power allocation cycle. In the next power allocation cycle, those power budgets 142 may change. In some embodiments, a power credit of a first power source (e.g., power source 130A) represents a different amount of power (e.g., 1 watt versus 2 watts) than a power credit of a second power source (e.g., power source 130B). Power budget generator 310 provides the power budget(s) 142 to split controller 320 as depicted—each power budget 142 can include an indication of the corresponding power source 130 as well.

Split controller 320, in various embodiments, is circuitry configured to split a received power budget 142 between components 120 coupled to the power source 130 that corresponds to that power budget 142. In various embodiments, split controller 320 splits a power budget 142 based on power split policy 144 and power source mapping 150. In particular, power split policy 144 may specify percentages of power to be allocated to different groups of components (e.g., the CPU processors, GPU processors, specific peripherals, and the remainder of system 100—components may be grouped by other criteria than type). While considerable flexibility may be available through specifying power split policy 144, at least the floor amount of power for each component 120 should be available to ensure correct operation. As a result, in various embodiments, split controller 320 can override power split policy 144 so that the floor amount of power is provided. That is, if a given group of components 120 is allocated too little power according to power split policy 144 to meet the floor amount of power for the members of that group, then split controller 320 may ensure that those component 120 receive the floor amount (or the requested amount, if less than the floor). In various embodiments, the same power split policy 144 is applied to all power sources 130, which may be done in order to maintain relative importance across all power sources 130—that is, if CPUs are more important than GPUs for one power source 130, then it is likely the same for another power source 130. While in various embodiments, split controller 320 is configured to apply the same power split policy 144 to all power budgets 142, in some embodiments, split controller 320 applies a power-source-specific power split policy 144 to the power budget 142 of that power source 130—that is, each power source 130 might have its own power split policy 144.

As a part of splitting a power budget 142, in various embodiments, split controller 320 accesses (e.g., from a set of programmable registers) power source mapping 150 to determine which components 120 are associated with that power budget 142. In particular, split controller 320 may determine which components 120 are coupled to a given power source 130, and then split the power budget 142 for that given power source 130 among the determined components 120. Thus, split controller 320 may apply power split policy 144 to the power budget 142 of a particular power source 130 to split suppliable power of the particular power source 130 among components 120 that receive power from the particular power source 130 as indicated by power source mapping 150. After splitting the power budget(s) 142 based on power split policy 144 and power source mapping 150, split controller 320 can provide the resulting power allocations to minimum selector 330. But in some embodiments, split controller 320 provides, to minimum selector 330, only the power allocations for components 120 coupled to multiple power sources 130 and provides the remaining power allocation(s) (e.g., in the form of power credits 230) to the relevant component(s) 120. That is, if a particular component 120 is not coupled to multiple power sources 130 and therefore may not be associated with multiple power allocations, then a minimum power allocation may not have to be selected. As such, the particular component's power allocation may be provided to it without sending the power allocation through minimum selector 330.

Minimum selector 330, in various embodiments, is circuitry configured to select, from a set of power allocations, a minimum power allocation to provide to a component 120 that is associated with those power allocations. As shown for example, component 120 is coupled to two power sources 130A and 130B. Power sources 130A and 130B can be different types (e.g., EVR and CLVR) and may be configured to supply a different amount of power to component 120 relative to the other power source 130. Consequently, minimum selector 330 may receive two power allocations for component 120: one power allocation corresponding to power source 130A and another power corresponding to power source 130B. When allocating power credits 230 to component 120, minimum selector 330 selects the minimum amount of power between the two power allocations and allocates the minimum amount of power to component 120. For example, if 20 watts of power is suppliable from power source 130A and 50 watts of power is suppliable from power source 130B to component 120 as based on power split policy 144, then minimum selector 330 may provide power credits 230 corresponding to 20 watts to component 120. In various embodiments, power splitter 140 implements a delay matching mechanism so that those components 120 that are physically nearer to power splitter 140 receive their power allocation at approximately the same time as those components 120 that are physically farther from power splitter 140. For example, each power allocation may be delayed by the difference between the actually transport delay to a component 120 and the transport delay to the farthest component 120 (at the granularity of a clock cycle, for example).

In various embodiments, power credits 230 representing the excess amount of power (e.g., 30 watts) from power sources 130 configured to supply more than the selected minimum power are provided to remainder distributor 340 for reallocation. Remainder distributor 340, in various embodiments, is circuitry configured to reallocate leftover/excess power credits 230 by providing power credits 230 to other power splitters 140 on other dies and/or adding power credits 230 to the power budget 142 of the corresponding power source 130 in the next power allocation cycle. One or more power credits 230 can be provided to transmit circuit 350, which is configured to transmit those power credits to the other power splitters 140 on other dies via D2D interface 240. Additionally, if another die shares power credits 230 with the current die, those shared power credits 230 can be received via D2D interface circuit 240 and may be sent to power budget generator 310 to be added to a corresponding power budget 142. As discussed in more detail with respect to FIG. 6, power credits 230 for different power budgets 142 can be sent and received via D2D interface 240.

Figure 4:
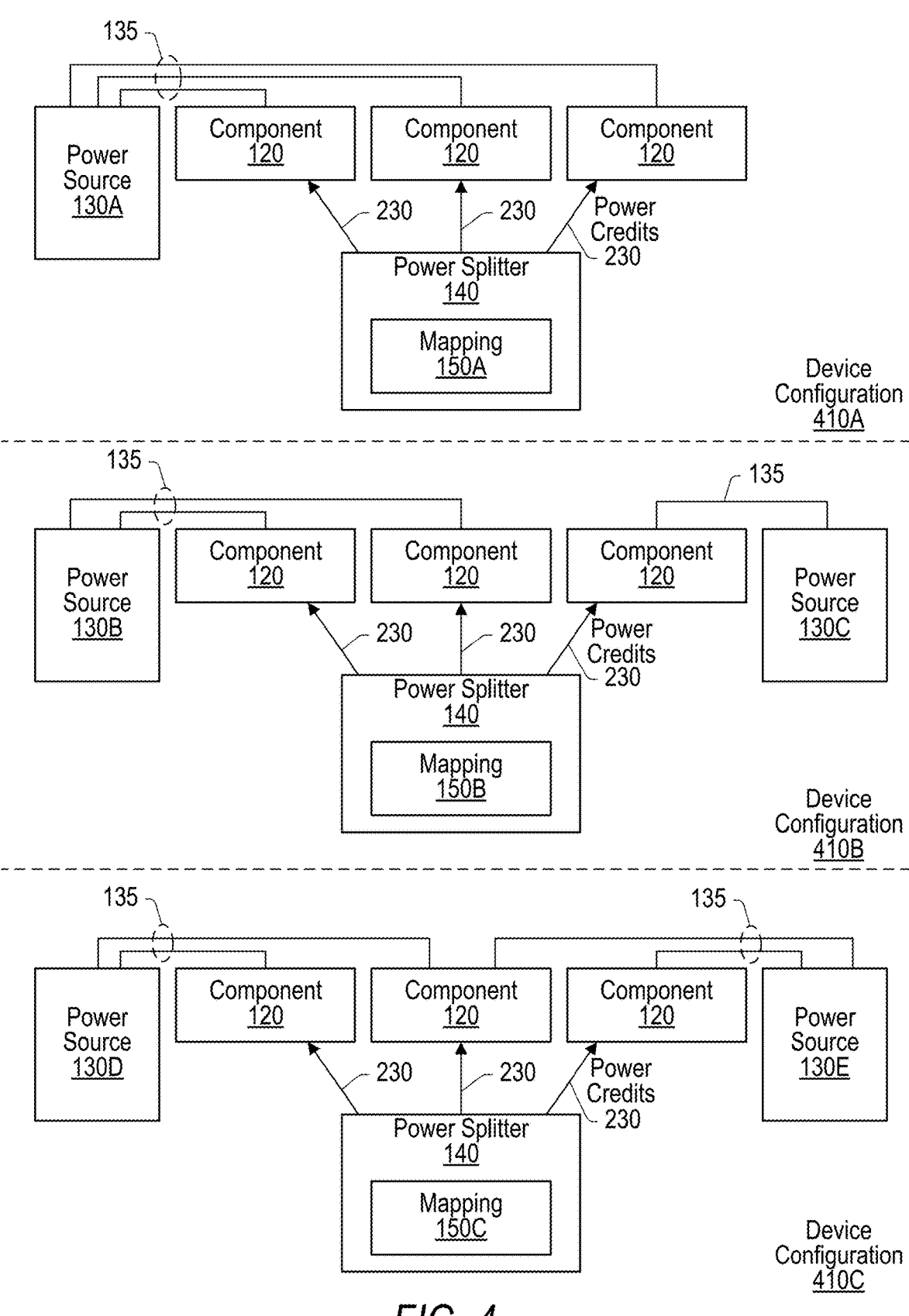
FIG. 4 is a block diagram illustrating different device configurations that have different power source configurations, according to some embodiments.

Turning now to FIG. 4, a block diagram of different device configurations 410 that have different power source configurations is shown. In the illustrated embodiment, there are three device configurations: 410A, 410B, and 410C. As shown, device configuration 410A includes three components 120 that are coupled to a power splitter 140 and one power source 130A. As further shown, device configuration 410B includes a power source 130B that is coupled to two components 120 and a power source 130C that is coupled to a third component 120, all three components 120 being coupled to a power splitter 140. Also as shown, device configuration 410C includes a power source 130D that is coupled to two components 120 and a power source 130E that is coupled to two components 120, one of which overlaps with power source 130D all three components 120 are coupled to a power splitter 140. Other device configurations 410 may have more or less power sources 130 and/or more or less components 120.

In various cases, the same design for a power splitter 140 is placed into different device configurations 410 that can correspond to different products (e.g., laptops, tablets, phones, etc.) having different power source configurations. As discussed, to be able to support the different configurations, a power splitter 140 stores a mapping 150 between components 120 and power sources 130 of its device configuration 410. The mapping 150 can be different between device configurations 410 having different power configurations, and thus through that mapping 150, a power splitter 140 may determine its system's particular configuration of power sources 130 to component 120. For example, mapping 150A of device configuration 410A is different than mapping 150B of device configuration 410B as device configuration 410B has multiple power sources 130. While device configuration 410B and device configuration 410C having the same number of power sources 130, mapping 150B is different than mapping 150C of configuration 410C since the power sources 130 of device configuration 410C couple to the illustrated three components 120 differently than the power sources 130 of device configuration 410B. As such, based on the mapping 150 of a given device configuration 410, a power splitter 140 can allocate power credits 230 to the components 120 of that given device configuration 410.

Figure 5:
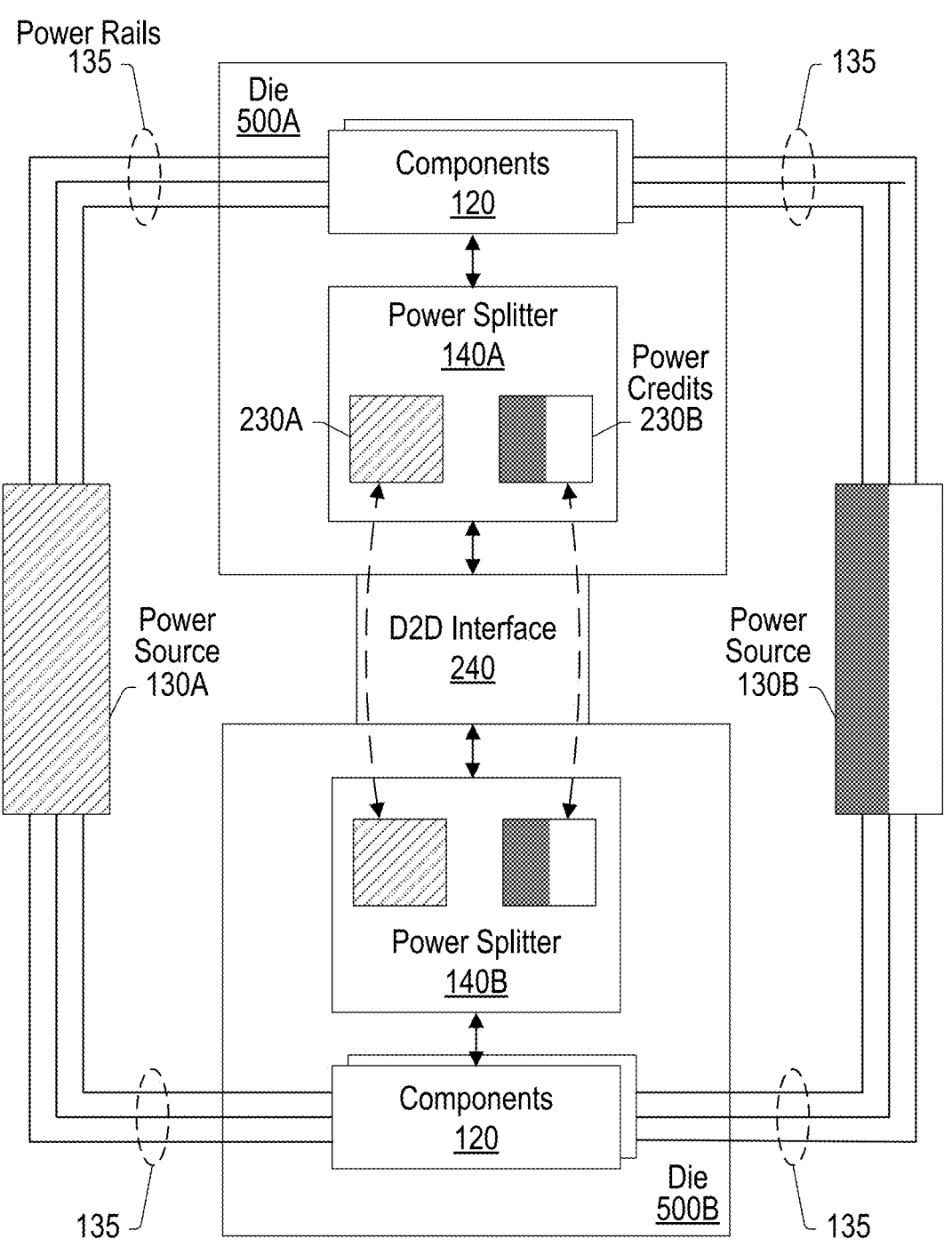
FIG. 5 is a block diagram illustrating example elements of a multi-die configuration in which dies share power credits for multiple power sources, according to some embodiments.

Turning now to FIG. 5, a block diagram of one embodiment of a multi-die configuration having dies 500 that can share power credits 230 for multiple power sources 130 is shown. In the illustrated embodiment, there are dies 500A and 500B that are coupled together via a D2D interface 240, and power sources 130A and 130B that are coupled to dies 500A and 500B. As further shown, die 500A includes a set of components 120 that are coupled to a power splitter 140A, and die 500B includes a set of components 120 that are coupled to a power splitter 140B. Also as shown, power splitters 140A and 140B each include power credits 230A corresponding to power source 130A and power credits 230B corresponding to power source 130B.

Integrated circuit dies 500 (or simply "dies"), in various embodiments, are component packages that integrate one or more components (e.g., components 120, power splitters 140A, etc.) on respective semiconductor substrates—each die 500 may be an SOC. In some instances, dies 500A and 500B may include the same set of hardware components printed on each chip and be referred to as symmetrical dies relative to each other. In other instances, dies 500A and 500B may include different sets of hardware components printed on each chip and be referred to as asymmetrical dies relative to each other. As an example, die 500A may be a CPU die that comprises CPU-oriented components while die 500B may be a GPU die that comprises GPU-oriented components and thus those dies 500 are asymmetrical relative to each other. In various embodiments, dies 500A and 500B are configured as a single system in which the existence of multiple dies is transparent to software executing on the single system-system 100 may be a multi-die system in which the hardware hides the fact that there are multiple dies from software (e.g., by ensuring latencies are low, keeping power states synchronized, etc.).

In various embodiments, multiple dies 500 can be supplied by a power source 130 (e.g., a first level voltage regulator through second level voltage regulators). Because dies 500A and 500B share a same power source 130 (e.g., power source 130A), in various embodiments, their respective power splitters 140 can share power credits 230 and still protect the capacity of that same power source 130. As such, power splitter 140A may send, to power splitter 140B, power credits 230 corresponding to unused power that can be used by power splitter 140B to allocate additional power from a shared power source 130 to components 120 of die 500B. Those power credits 230 may be included in a subsequent power allocation. Further, multiple power sources 130 can deliver power to the same dies 500 (as shown) and thus power splitters 140 may share power credits 230 for multiple power sources 130. As shown for example, power splitters 140A and 140B share power credits 230A for power source 130A and power credits 230B for power sources 130B.

Different combinations of power credit sharing can occur. For example, power splitter 140A may share power credits 230 for power sources 130A and 130B in one power allocation cycle while not receiving any power credits 230 from power splitter 140B within that cycle. In another power allocation cycle, power splitter 140A may share only power credits 230A while power splitter 140B may share only power credits 230B. In yet another power allocation cycle, power splitters 140A and 140B may share both power credits 230 for both power sources 130A and 130B. In various embodiments, a power splitter 140 is forced to share at least a portion of the power credits 230 for a given power source 130 (if sharing is applicable). Accordingly, the power splitter 140 may 1) ensure that the floor values of its components 120 are met, 2) share a defined number of power credits 230 with power splitters 140 of other dies 500, and 3) then, from the remaining power budget 142, allocate additional power to its components 120 based on a power split policy 144. The number of power credits 230 that a power splitter 140 is forced to share may be defined in a power split policy 144 or in a separate force share policy that may be stored in programmable registers accessible to a power splitter 140. Further, power splitters 140 residing in different dies 500 may use the same power split policy 144 or different power split policies 144.

Figure 6:
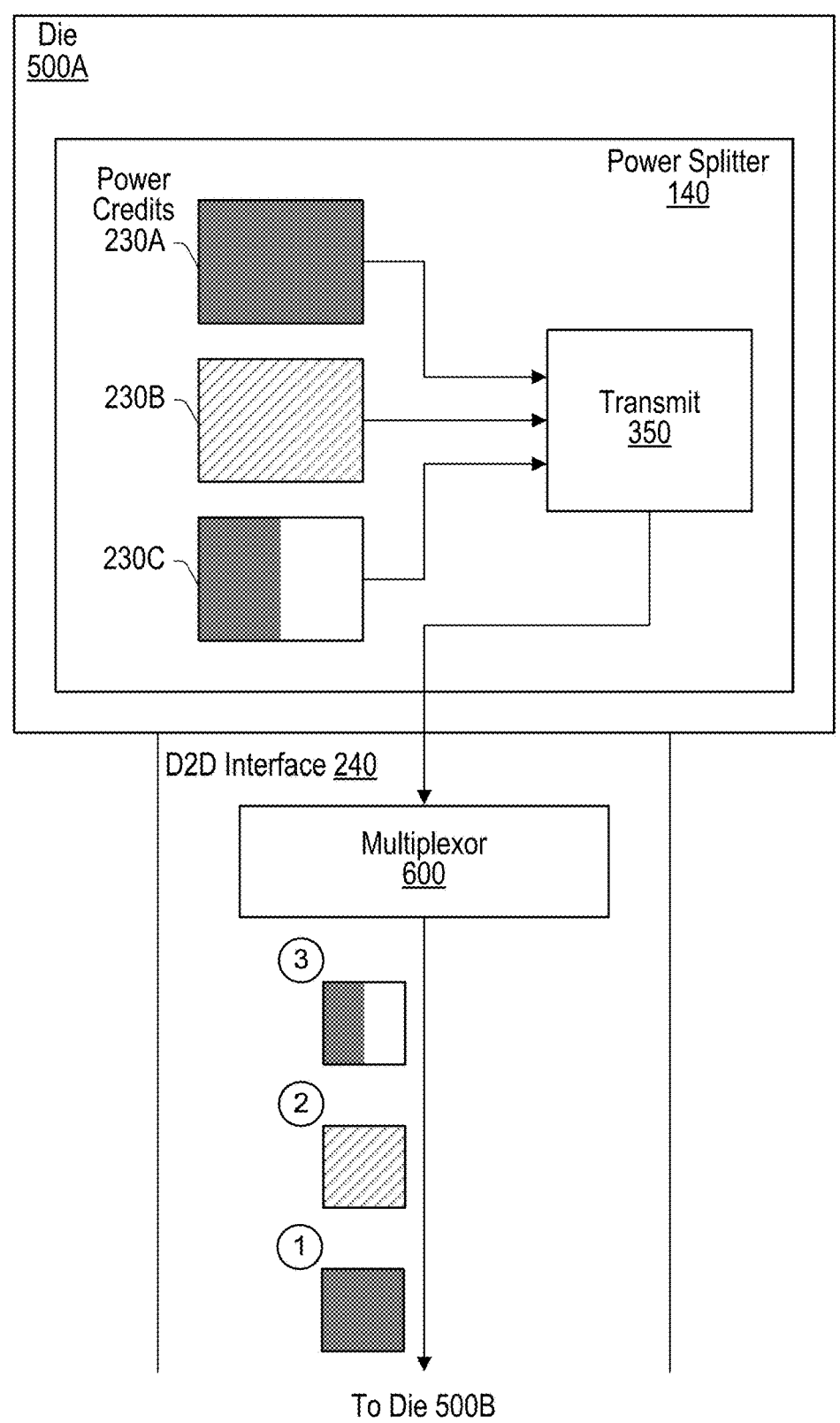
FIG. 6 is a block diagram illustrating example elements of a die-to-die (D2D) interface that is used to send power credits between dies, according to some embodiments.

Turning now to FIG. 6, a block diagram of one embodiment of power credits 230 being shared between dies 500 across a D2D interface 240 is shown. In the illustrated embodiment, die 500A includes a power splitter 140 that allocates power credits 230A, 230B, and 230C that respectively correspond to different power sources 130. As shown, power splitter 140 includes a transmit circuit 350 that interfaces to D2D interface 240 for transmitting power credits 230A, 230B, and 230C to die 500B. As further shown, D2D interface 240 includes a multiplexor 600 that is configured to transmit those power credits 230.

In order to reduce the number of physical lanes in D2D interface 240 between dies 500, in various embodiments, dies 500 are configured to send one type of power credit at time using multiplexor 600. Multiplexor 600, in various embodiments, is circuitry configured to send, on the same set of lanes, power credits 230 of a first given power source 130 before power credits 230 of a second given power source 130. As illustrated for example, power splitter 140 causes power credits 230A to be sent first, followed by power credits 230B, and finally power credits 230C. In some embodiments, D2D interface 240 does not include multiplexor 600 and instead transmit circuit 350 controls the flow of power credits 230 onto the same set of lanes of D2D interface 240. In some embodiments, D2D interface 240 supports multiple power credit types to be sent in parallel across different lanes. Consequently, power credits 230A-C may be sent in parallel across D2D interface 240 instead of one at a time. This can improve the transmission speed of multiple power credit types at the cost of die space and complexity involved in adding and handling the additional bus lanes.

Figure 7:
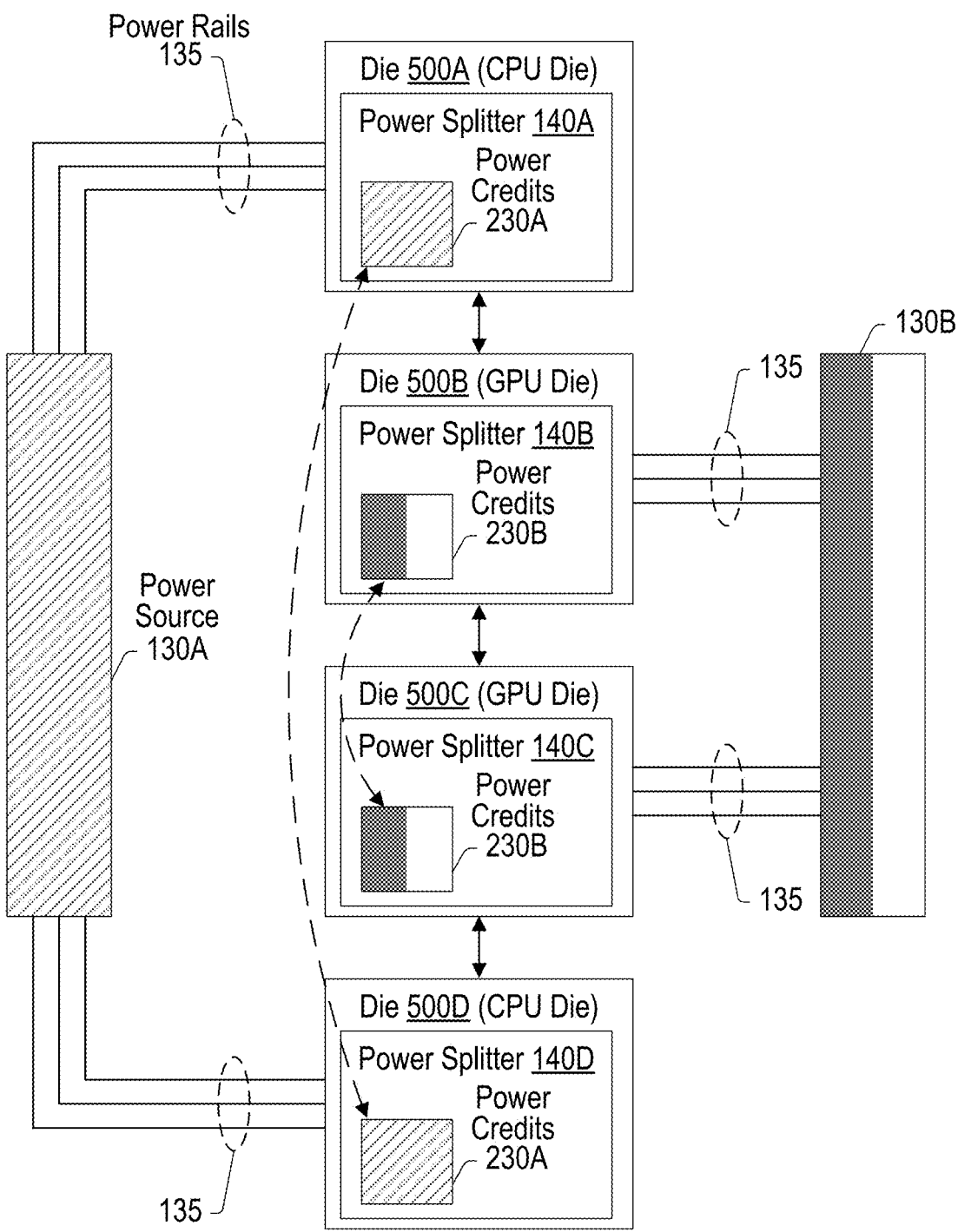
FIG. 7 is a block diagram illustrating example elements of a multi-die configuration in which multiple dies share power credits through a set of intervening dies that do not consume those power credits, according to some embodiments.

In some cases, a die 500 is coupled to multiple dies 500 that are oriented around the die 500—e.g., a die 500 could be between multiple dies 500 as shown in FIG. 7. A portion of D2D interface 500 may be on different sides of a die 500 to permit that die 500 to send power credits 500 to the surrounding dies 500. As an example, in the case of a die 500 residing in the middle of two dies 500, the die 500 may send power credits 230 in one direction on D2D interface 240 to one of the two other dies 500 and may send power credits 230 in another direction on D2D interface 240 to the other die 500. In some cases, in a multi-die layout, a particular die 500 may be coupled to only one other die 500, which may be coupled to multiple dies 500. The particular die 500 may only be able to send power credits 230 in one direction (i.e., towards the one other die 500 coupled to it).

Turning now to FIG. 7, a block diagram of one embodiment of an asymmetrical layout of dies 500 is shown. In the illustrated embodiment, there are dies 500A-D and power sources 130A-B. As further shown, die 500A is coupled to die 500B and power source 130A, die 500B is coupled to die 500C and power source 130B, die 500C is coupled to die 500D and power source 130B, and die 500D is coupled to power source 130A. As shown, dies 500A and 500D are CPU dies while dies 500B and 500C are GPU dies.

In certain device configurations, multiple dies 500 can share a power source 130 but be separated by one or more intervening dies 500 that are not coupled to that power source. This may occur in asymmetrical layouts, such as the illustrated layout, as symmetrically similar dies 500 may share a power source 130 for which is not desirable to couple to intervening dies 500 that are asymmetrical with respect to those symmetrically similar dies 500. For example, two dies 500 that include a first type of processor (e.g., CPUs) but not a second type of processor (e.g., GPUs) may share a power source 130 that is not shared with a set of intervening dies 500 having the second type of processor but not the first type of processor. In various embodiments, dies 500 that share a power source 130 are configured to share power credits 230, even in cases in which there are intervening dies 500 that cannot use those power credits 230 as they are not coupled to the power source 130 and thus cannot receive power from it. In order to share power credits 230 in such cases, in various embodiments, a die 500 transmits those power credits 230 through the intervening dies 500 (via D2D interface 240) to the destination die 500 that shares the particular power source 130. As shown for example, power splitters 140A and 140D share power credits 230A (corresponding to power source 130A) by sending them through dies 500B and 500C. Dies 500B and 500C do not use those power credits 230A since they are not coupled to power source 130A. Instead, in various embodiments, those dies 500 comprise circuitry that is configured to forward those power credits 230 to the next, neighboring die 500.

Accordingly, when allocating power for a power source 130 that is configured to supply power to dies 500 separated by intervening dies 500, the power splitters 140 of those dies 500 may generate power budgets 142 for that power source 130. Those power budgets 142 can be generated based on a power split policy 144 and a power source mapping 150 that may permit a given power splitter 140 to determine which other power splitters 140 and their dies 500 are connected to a particular power source 130. For example, power splitter 140A may determine from a power source mapping 150 that die 500D is connected to power source 130A and thus power splitter 140A can share power credits 230A with power splitter 140D. Based on the power budgets 142, the power splitters 140 may allocate at least a subset of power credits 230 from their respective power budgets 142 to components 120 in their respective dies 500 (e.g., in order to meet floor values of those components 120) The power splitters 140 may then provide a subset of power credits to their companion die(s) 500 (e.g., power splitter 140A may send power credits 230A to power splitter 140D in die 500D and vice versa) through the intervening dies 500 (e.g., dies 500B and 500C) without the intervening dies 500 using the power credits 230 to obtain power from the power source 130.

In various embodiment, power splitters 140 share power credits 230 that are left over after satisfying the demands of their components 120. Thus, in one power allocation, a power splitter 140 might share power credits 230 with another power splitter 140, and then in the next power allocation, it may not share power credits 230 (e.g., due to demand changes in its own components 120). In some embodiments, a power split policy 144 specifies a number of power credits 230 that have to be shared in a power allocation, although more might be shared. Thus, a power splitter 140 may share a minimum number of power credits 230 (e.g., 20% of a power budget 142) with another power splitter 140 for each power allocation.

In various cases (e.g., in asymmetrical layouts), certain dies 500 are coupled to a power source 130 without there being any intervening dies 500. As an example, dies 500B and 500C are coupled to power source 130B and there are no intervening die 500 between them. As such, those dies 500 can share power credits (e.g., power credits 230B corresponding to power source 130B) without sending them through intervening dies 500. While dies 500A-D are laid out in a straight line in FIG. 7, other asymmetrical layouts can be used than shown. For example, dies 500A-D might be laid out in a circle where, e.g., die 500A and die 500D are placed on the west and east sides of the circle respectively and die 500B and die 500C are placed on the north and south sides. In such a layout, both symmetrical sets of dies (e.g., dies 500A/D and dies 500B/C) may share power credits through intervening dies 500 that do not use them—i.e., die 500A and die 500D may send power credits to each other through die 500B or 500C, and die 500B and die 500C may send power credits to each other through die 500A or 500D.

Figure 8:
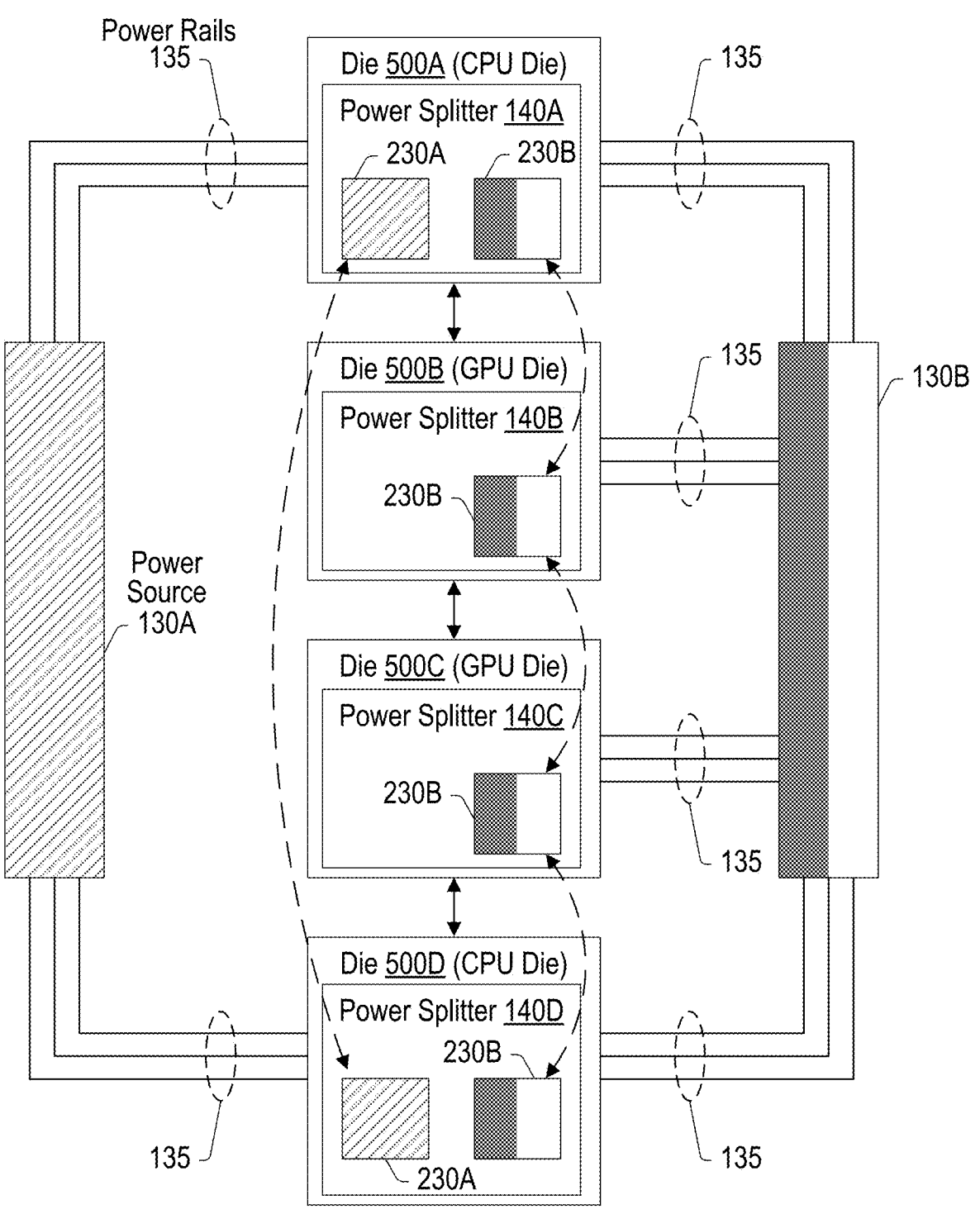
FIG. 8 is a block diagram illustrating example elements of a multi-die configuration in which dies that are asymmetric to each other share power credits for a common power source, according to some embodiments.

Turning now to FIG. 8, a block diagram of one embodiment of an asymmetrical layout of dies 500 is shown. In the illustrated embodiment, there are dies 500A-D and power sources 130A-B. As shown, die 500A is coupled to die 500B and power sources 130A and 130B, die 500B is coupled to die 500C and power source 130B, die 500C is coupled to die 500D and power source 130B, and die 500D is coupled to power sources 130A and 130B. Also as shown, dies 500A and 500D are CPU dies while dies 500B and 500C are GPU dies.

In various embodiments, symmetrically similar dies 500 can share a power source 130 with dies 500 that are asymmetrical with respect to those symmetrically similar dies 500. As shown for example, dies 500A-D all share power source 130B. Power source 130B may be a battery of a system 100 having dies 500A-D—it may be desirable to couple all dies 500 of that system 100 to a battery so that those dies 500 can continue to receive power when that system 100 is not connected to a power outlet, for example. In various embodiments, dies 500A-D are configured to share power credits 230B for power source 130B, even though dies 500A and 500D asymmetrical with respect to dies 500B and 500C.

Different approaches may be used when sharing power credits 230 with many dies 500. In some embodiments, a power splitter 140 divides power credits 230 that are to be shared into equal amounts such that each of the other dies 500 receives an equal (or roughly equal) amount of power credits 230. For example die 500 may provide a ten power credits 230B to die 500B, 500C, and 500D. In some embodiments, a power splitter 140 divides power credits 230 based on the type of die 500 being shared with—e.g., GPU dies 500 may receive more power credits 230 than CPU dies 500. In some embodiments, a power splitter 140 divides power credits 230 based on whether a particular die 500 is symmetrically similar to it. For example, from thirty power credits 230B, power splitter 140A may provide twenty power credits 230B to die 500D because its symmetrically similar and five power credits 230B each to dies 500B and 500C as that are asymmetrical with respect to die 500A. In some embodiments, a power splitter 140 provides all power credits 230 (from those being shared) to the neighboring die 500 that may use them all or send at least a portion to the next neighboring die 500. As an example, power splitter 140A may provide thirty power credits 230B to die 500B, and die 500B may use ten of those power credits 230B and send the remaining amount to die 500C. Any combination of the above approaches may be used. Other approaches may be used and are contemplated, such as a die 500 providing a request for a particular amount of power credits 230 to the other dies 500 and those dies 500 allocating their power credits 230 (from those being shared) based on that request.

While asymmetrical layouts of dies 500A-D are illustrated in FIGS. 7 and 8, dies 500A-D may be laid out differently. For example, dies 500A and 500D may be directly coupled and one of those two dies 500 may be directly coupled to die 500B or 500C, which may be directly coupled together—i.e., CPU die<->CPU die<->GPU die<-> GPU die. In such a layout, dies 500A and 500D may directly share power credits 230 and dies 500B and 500C may also share power credits 230 without sending them through any intervening asymmetrical dies 500. Also, in some power configurations, there can be a first set of dies 500 that share a power source 130 and are separated by a second set of intervening dies 500 that are symmetrically similar to the first set of dies 500. The first set of dies 500 may share power credits 500 through the second set of intervening dies 500 without the intervening dies 500 using those power credits 230 to obtain power from that power source 130.

Turning now to FIG. 9, a flow diagram of a method 900 is shown. Method 900 is one embodiment of a method that is performed by a power splitter circuit (e.g., power splitter 140) to allocate power to a plurality of component circuits (e.g., components 120) that are coupled to a plurality of power sources (e.g., power sources 130A-B). Method 900 may include more or less steps than shown. As an example, method 900 might include a step in which the power splitter circuit actively shares power credits with another power splitter circuit (that may reside on another die) for obtaining power from the power sources.

Method 900 begins in step 910 with the power splitter circuit accessing information (e.g., power source mapping 150) from one or more programmable registers accessible to the power splitter circuit. The information specifies which ones of a plurality of power sources of the system are configured to supply power to which ones of a plurality of component circuits managed by the power splitter circuit. In step 920, the power splitter circuit determines, based on the information, that multiple ones of the plurality of power sources are configured to supply power to a particular one of the plurality of component circuits. In some embodiments, at least two of those power sources are different types (e.g., EVR and CLVR) and are each configured to supply a different amount of power to the particular component circuit. At least one of the multiple power sources may be a battery.

In step 930, the power splitter circuit then allocates power to the particular component circuit based on the respective power budgets (e.g., power budgets 142) of the multiple power sources. The allocating of the power to the particular component circuit may include the power splitter circuit determining a plurality of amounts of power suppliable by the multiple power sources to the particular component circuit based on the respective power budgets. The power splitter circuit may then select a minimum of the plurality of amounts of power and allocate that minimum amount of power to the particular component circuit. In some embodiments, the power splitter circuit shares, to another power splitter circuit managing a different component circuit, power credits corresponding to unused power. The other power splitter circuit may then allocate, based on the power credits, additional power from the multiple power sources to the different component circuit.

Figure 10:

Turning now to FIG. 10, a flow diagram of a method 1000 is shown. Method 1000 is one embodiment of a method that is performed by a power splitter circuit (e.g., power splitter 140) to allocate power to a plurality of component circuits (e.g., components 120) that are coupled to a plurality of power sources (e.g., power sources 130A-B). Method 1000 may include more or less steps than shown. As an example, method 1000 might include a step in which the power splitter circuit actively shares power credits with another power splitter circuit (that may reside on another die) for obtaining power from the power sources.

Method 1000 begins in step 1010 with the power splitter circuit accessing, from one or more programmable registers, a mapping (e.g., power source mapping 150) mapping between ones of the plurality of component circuits and ones of the plurality of power sources. Two of the plurality of power sources may be configured to supply a different amount of power, and also a particular one of the plurality of component circuits may be configured to receive power from the two or more power sources. In some cases, a first one of the plurality of power sources may be an electronic voltage regulator and a second one of the plurality of power sources may be an inductor-based voltage regulator. At least one of the plurality of component circuits may be a graphics processing unit (GPU).

In step 1020, the power splitter circuit allocates power to a given one of the plurality of component circuits based on one or more power budgets (e.g., power budgets 142) of one or more power sources mapped to the given component circuit as indicated by the mapping. In various embodiments, the power splitter circuit is configured to allocate power to at least two different component circuits that are coupled to different power sources. Two power sources may supply power to a particular component circuit. The power splitter circuit may determine a first amount of power to supply the particular component circuit from a first one of the two power sources and a second amount of power to supply the particular component circuit from a second one of the two power sources. The power splitter circuit may then select a minimum of the first amount of power and the second amount of power and allocate the minimum amount of power to the particular component circuit. The power splitter circuit may reallocate, from at least one of the power sources (e.g., the second power source if it did not provide the minimum power), an unused portion of power to a corresponding power budget (e.g., the second power source's budget) in the next power allocation cycle. In various embodiments, the power splitter circuit is configured to apply the same power split policy (e.g., a power split policy 144) to the respective power budgets of the power sources. Allocated power may be represented in terms of a plurality of credits. A given credit may represent a specified amount of power, and a given component circuit may include a rate control circuit configured to manager power consumption in the given component circuit based on received allocated credits.

In some embodiments, the system includes a plurality of integrated circuit dies coupled together. A first integrated circuit die may include the plurality of component circuits and the power splitter circuit, and a second integrated circuit die may include a plurality of component circuits and another power splitter circuit. The first and second integrated circuit dies may be symmetric or asymmetric with respect to each other. In some embodiments, at least two of the plurality of power sources are configured to supply power to the same integrated circuit die of the plurality of integrated circuit dies.

Turning now to FIG. 11, a flow diagram of a method 1100 is shown. Method 1100 is one embodiment of a method performed by a first integrated circuit die (e.g., die 500A of FIG. 7) as part of allocating power from a set of power sources (e.g., power sources 130). Method 1100 begins in step 1110 with the first integrated circuit die accessing information identifying a power budget (e.g., a power budget 142) of a first power source that is configured to supply power to the first integrated circuit die and a second integrated circuit die (e.g., die 500D of FIG. 7). In various embodiments, power is obtainable from the first power source based on a plurality of power credits included in the power budget.

In step 1120, the first integrated circuit die allocates a first set of the plurality of power credits to a set of component circuits (e.g., components 120) of the first integrated circuit die. In step 1130, the first integrated circuit die sends a second set of the plurality of power credits to the second integrated circuit die through a set of intervening integrated circuit dies (e.g., dies 500B-C of FIG. 7) without the set of intervening integrated circuit dies using the second set of power credits to obtain power from the first power source. In various embodiments, the first and second integrated circuit dies are asymmetric with respect to the set of intervening integrated circuit dies—e.g., the first and second integrated circuit dies include CPU circuitry and the set of intervening integrated circuit dies include GPU circuitry. The first power source may not supply power to the set of intervening integrated circuit dies. Also, the first integrated circuit die may receive a third set of power credits for the first power source from the second integrated circuit die, and allocate the third set of power credits to the set of component circuits of the first integrated circuit die.

In some instances, the first integrated circuit dies sends a fourth set of power credits to a particular one of the set of intervening integrated circuit dies. The particular intervening die may obtain, based on the fourth set of power credits, power from a second power source that is configured to supply power to the first integrated circuit die and the particular intervening integrated circuit die. The second set of credits may be sent before the fourth set of credits on the same set of lanes of a die-to-die interface that connects the first integrated circuit die to the particular intervening integrated circuit die.

Turning now to FIG. 12, a flow diagram of a method 1200 is shown. Method 1200 is one embodiment of a method performed by a first integrated circuit die (e.g., die 500A of FIG. 7) as part of allocating power from a set of power sources (e.g., power sources 130). Method 1200 begins in step 1210 with the first integrated circuit die allocating a first set of power credits to a first set of component circuits (e.g., components 120), of the first integrated circuit die, that is configured to obtain power from a first power source based on the first set of power credits.

In step 1220, the first integrated circuit die sends a second set of power credits to a second integrated circuit die, through the set of intervening integrated circuit dies, that is configured to obtain power from the first power source based on the second set of power credits. The set of intervening integrated circuit dies may not be configured to utilize the second set of power credits to obtain power from the first power source. In various embodiments, ones of the set of intervening integrated circuit dies are configured to share power credits with each other to obtain power from a second power source without sending those power credits through other integrated circuit dies (e.g., dies 500B-C of FIG. 7 can directly share power credits). In various embodiments, the first and second integrated circuit dies are asymmetric with respect to the set of intervening integrated circuit dies. As an example, the first and second integrated circuit dies may include central processing unit (CPU) processors but not graphics processing unit (GPU) processors while the set of intervening integrated circuit dies may include GPU processors but not CPU processors.

A second power source may be configured to supply power to component circuits of the first and second integrated circuit dies. The first integrated circuit die may allocate, to a second set of component circuits of the first integrated circuit die, a third set of power credits usable to obtain power from the second power source and send, to the second integrated circuit die through the set of intervening integrated circuit dies, a fourth set of power credits usable to obtain power from the second power source. In various embodiments, the first and second power sources are different types of power sources (e.g., EVR and CLVR). The first integrated circuit die may be coupled to a multiplexor circuit (e.g., multiplexor 600) that is configured to send, on the same set of lanes of a die-to-die interface (e.g., D2D interface 240), power credits of a first given power source before power credits of a second given power source.

A power source may be configured to supply power to component circuits of the first and second integrated circuit dies and the set of intervening integrated circuit dies. As such, the first and second integrated circuit dies and the set of intervening integrated circuit dies may be configured to share second power credits to obtain power from the second power source. In some cases, the power source is a battery.

Example Device

Figure 13:
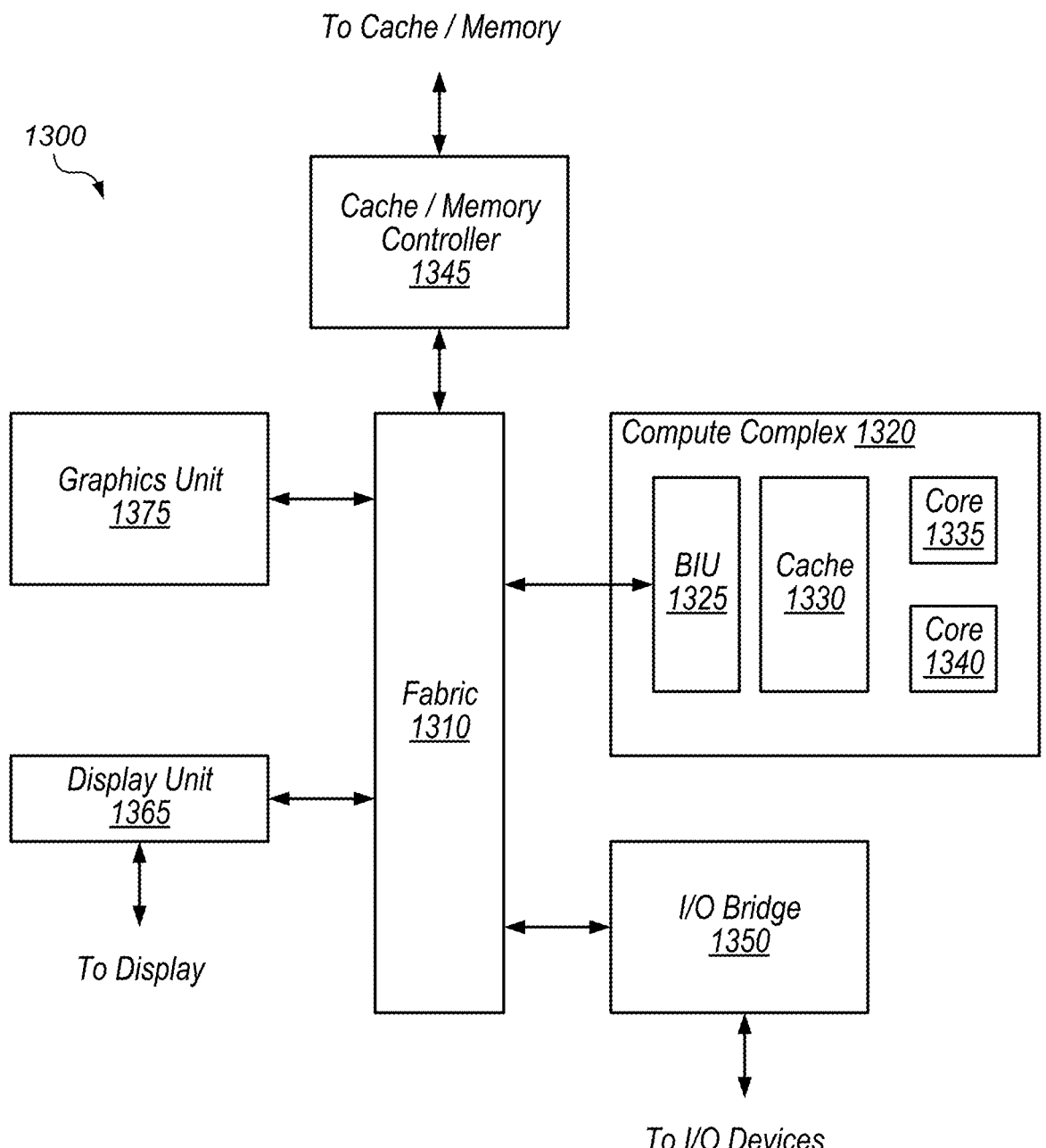
FIG. 13 is a block diagram illustrating elements of a device that implements components described in the present disclosure, according to some embodiments.

Referring now to FIG. 13, a block diagram illustrating an example embodiment of a device 1300 is shown. In various embodiments, device 1300 corresponds to system 100. Elements of device 1300 may be included in a system on a chip. In some embodiments, device 1300 is included in a mobile device, which may be battery-powered. Thus, power consumption by device 1300 may be an important design consideration. In the illustrated embodiment, device 1300 includes fabric 1310, compute complex 1320, input/output (I/O) bridge 1350, cache/memory controller 1345, graphics unit 1375, and display unit 1365. Compute complex 1320, cache/memory controller 1345, input/output (I/O) bridge 1350, graphics unit 1375, and display unit 1365 may be components 120. In some embodiments, device 1300 may include other components (not shown) in addition to or in place of the illustrated components, such as video processor encoders and decoders, image processing or recognition elements, computer vision elements, etc.

Fabric 1310 may include various interconnects, buses, MUX's, controllers, etc., and may be configured to facilitate communication between various elements of device 1300. In some embodiments, portions of fabric 1310 may be configured to implement various different communication protocols. In other embodiments, fabric 1310 may implement a single communication protocol and elements coupled to fabric 1310 may convert from the single communication protocol to other communication protocols internally.

In the illustrated embodiment, compute complex 1320 includes bus interface unit (BIU) 1325, cache 1330, and cores 1335 and 1340. In various embodiments, compute complex 1320 may include various numbers of processors, processor cores and caches. For example, compute complex 1320 may include 1, 2, or 4 processor cores, or any other suitable number. In one embodiment, cache 1330 is a set associative L2 cache. In some embodiments, cores 1335 and 1340 may include internal instruction and data caches. In some embodiments, a coherency unit (not shown) in fabric 1310, cache 1330, or elsewhere in device 1300 may be configured to maintain coherency between various caches of device 1300. BIU 1325 may be configured to manage communication between compute complex 1320 and other elements of device 1300. Processor cores such as cores 1335 and 1340 may be configured to execute instructions of a particular instruction set architecture (ISA) which may include operating system instructions and user application instructions. These instructions may be stored in computer readable medium such as a memory coupled to memory controller 1345 discussed below.

As used herein, the term "coupled to" may indicate one or more connections between elements, and a coupling may include intervening elements. For example, in FIG. 13, graphics unit 1375 may be described as "coupled to" a memory through fabric 1310 and cache/memory controller 1345. In contrast, in the illustrated embodiment of FIG. 13, graphics unit 1375 is "directly coupled" to fabric 1310 because there are no intervening elements.

Cache/memory controller 1345 may be configured to manage transfer of data between fabric 1310 and one or more caches and memories. For example, cache/memory controller 1345 may be coupled to an L3 cache, which may in turn be coupled to a system memory. In other embodiments, cache/memory controller 1345 may be directly coupled to a memory. In some embodiments, cache/memory controller 1345 may include one or more internal caches. Memory coupled to controller 1345 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 1345 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 1320 to cause the computing device to perform functionality described herein.

Graphics unit 1375 may include one or more processors, e.g., one or more graphics processing units (GPUs). Graphics unit 1375 may receive graphics-oriented instructions, such as OPENGL®, Metal®, or DIRECT3D® instructions, for example. Graphics unit 1375 may execute specialized GPU instructions or perform other operations based on the received graphics-oriented instructions. Graphics unit 1375 may generally be configured to process large blocks of data in parallel and may build images in a frame buffer for output to a display, which may be included in the device or may be a separate device. Graphics unit 1375 may include transform, lighting, triangle, and rendering engines in one or more graphics processing pipelines. Graphics unit 1375 may output pixel information for display images. Graphics unit 1375, in various embodiments, may include programmable shader circuitry which may include highly parallel execution cores configured to execute graphics programs, which may include pixel tasks, vertex tasks, and compute tasks (which may or may not be graphics-related).

Display unit 1365 may be configured to read data from a frame buffer and provide a stream of pixel values for display. Display unit 1365 may be configured as a display pipeline in some embodiments. Additionally, display unit 1365 may be configured to blend multiple frames to produce an output frame. Further, display unit 1365 may include one or more interfaces (e.g., MIPI® or embedded display port (eDP)) for coupling to a user display (e.g., a touchscreen or an external display).

I/O bridge 1350 may include various elements configured to implement: universal serial bus (USB) communications, security, audio, and low-power always-on functionality, for example. I/O bridge 1350 may also include interfaces such as pulse-width modulation (PWM), general-purpose input/output (GPIO), serial peripheral interface (SPI), and inter-integrated circuit (I2C), for example. Various types of peripherals and devices may be coupled to device 1300 via I/O bridge 1350.

In some embodiments, device 1300 includes network interface circuitry (not explicitly shown), which may be connected to fabric 1310 or I/O bridge 1350. The network interface circuitry may be configured to communicate via various networks, which may be wired, wireless, or both. For example, the network interface circuitry may be configured to communicate via a wired local area network, a wireless local area network (e.g., via Wi-Fi™) or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 1300 with connectivity to various types of other devices and networks.

Example Applications

Figure 14:
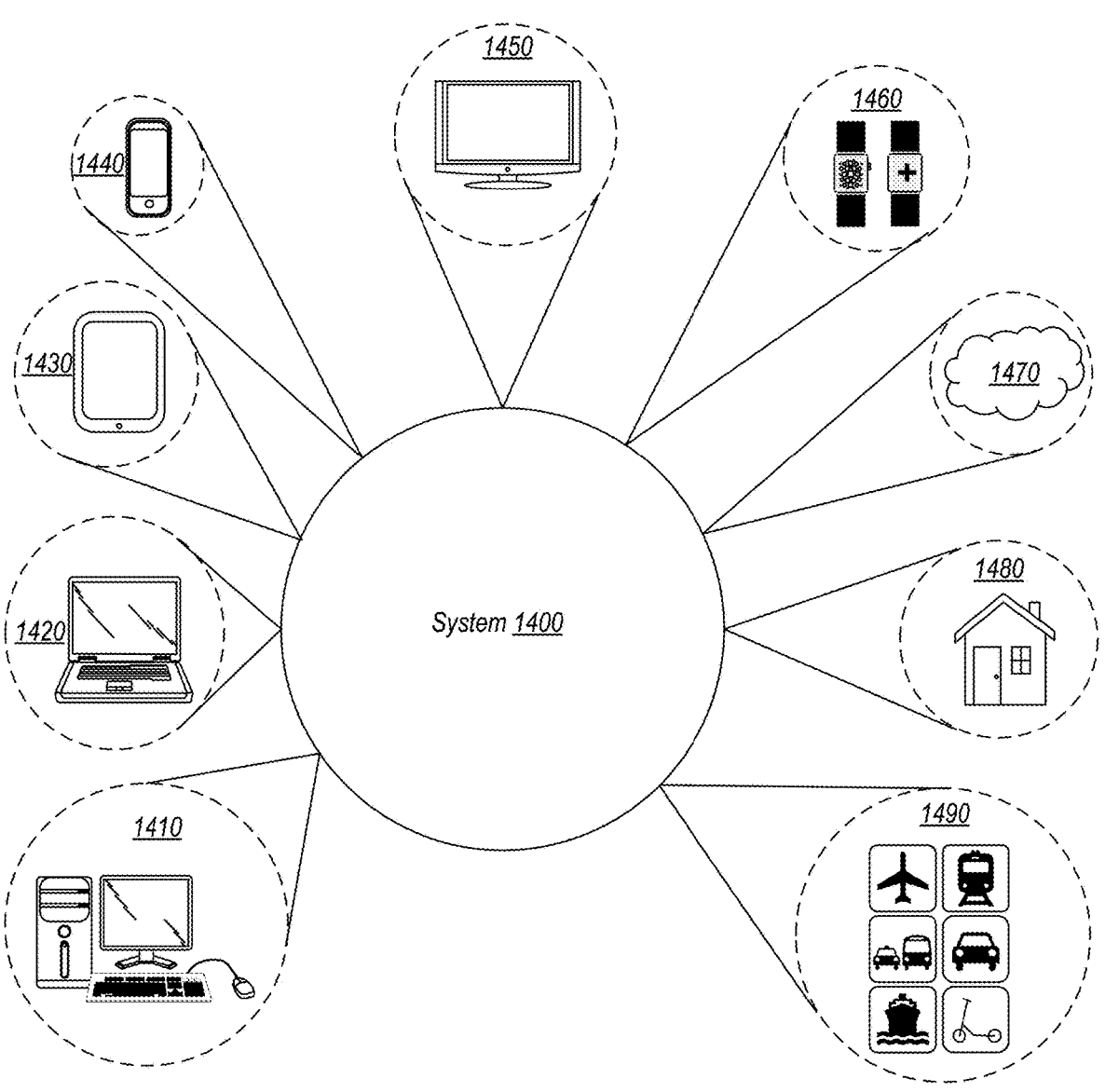
FIG. 14 is a block diagram illustrating an example of a system used in various types of applications, according to some embodiments.

Turning now to FIG. 14, various types of systems that may include any of the circuits, devices, or system discussed above. System or device 1400, which may incorporate or otherwise utilize one or more of the techniques described herein (e.g., system or device 1400 may correspond to system 100), may be utilized in a wide range of areas. For example, system or device 1400 may be utilized as part of the hardware of systems such as a desktop computer 1410, laptop computer 1420, tablet computer 1430, cellular or mobile phone 1440, or television 1450 (or set-top box coupled to a television).

Similarly, disclosed elements may be utilized in a wearable device 1460, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1400 may also be used in various other contexts. For example, system or device 1400 may be utilized in the context of a server computer system, such as a dedicated server or on shared hardware that implements a cloud-based service 1470. Still further, system or device 1400 may be implemented in a wide range of specialized everyday devices, including devices 1480 commonly found in the home such as refrigerators, thermostats, security cameras, etc. The interconnection of such devices is often referred to as the "Internet of Things" (IoT). Elements may also be implemented in various modes of transportation. For example, system or device 1400 could be employed in the control systems, guidance systems, entertainment systems, etc. of various types of vehicles 1490.

The applications illustrated in FIG. 14 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 15:
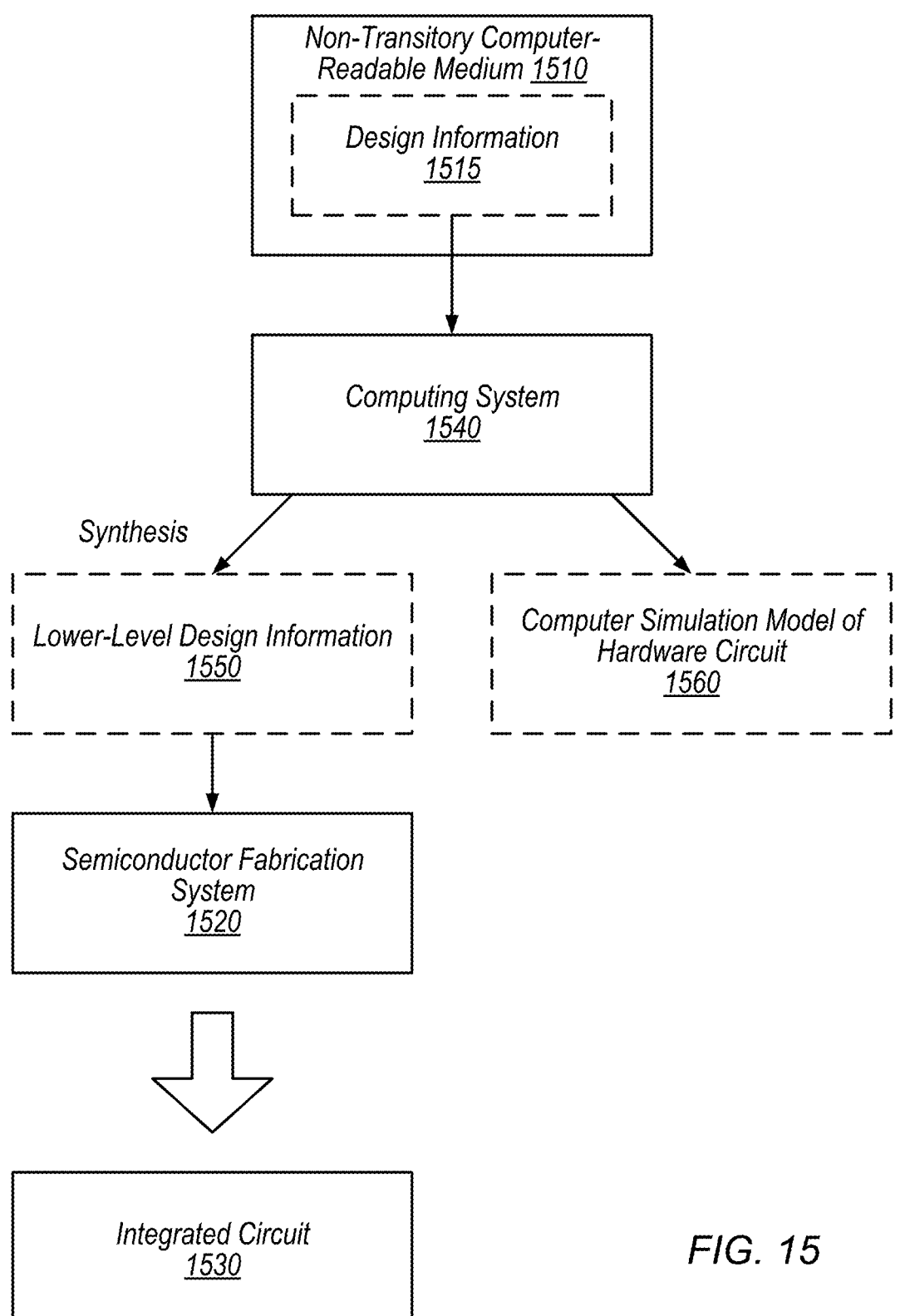
FIG. 15 is a block diagram illustrating an example process of fabricating an integrated circuit, according to some embodiments.

FIG. 15 is a block diagram illustrating an example non-transitory computer-readable storage medium that stores circuit design information, according to some embodiments. In the illustrated embodiment, computing system 1540 is configured to process the design information. This may include executing instructions included in the design information, interpreting instructions included in the design information, compiling, transforming, or otherwise updating the design information, etc. Therefore, the design information controls computing system 1540 (e.g., by programming computing system 1540) to perform various operations discussed below, in some embodiments.

In the illustrated example, computing system 1540 processes the design information to generate both a computer simulation model of a hardware circuit 1560 and lower-level design information 1550. In other embodiments, computing system 1540 may generate only one of these outputs, may generate other outputs based on the design information, or both. Regarding the computing simulation, computing system 1540 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1540 also processes the design information to generate lower-level design information 1550 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1550 (potentially among other inputs), semiconductor fabrication system 1520 is configured to fabricate an integrated circuit 1530 (which may correspond to functionality of the simulation model 1560). Note that computing system 1540 may generate different simulation models based on design information at various levels of description, including information 1550, 1515, and so on. The data representing design information 1550 and model 1560 may be stored on medium 1510 or on one or more other media.

In some embodiments, the lower-level design information 1550 controls (e.g., programs) the semiconductor fabrication system 1520 to fabricate the integrated circuit 1530. Thus, when processed by the fabrication system, the design information may program the fabrication system to fabricate a circuit that includes various circuitry disclosed herein.

Non-transitory computer-readable storage medium 1510, may comprise any of various appropriate types of memory devices or storage devices. Non-transitory computer-readable storage medium 1510 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1510 may include other types of non-transitory memory as well or combinations thereof. Accordingly, non-transitory computer-readable storage medium 1510 may include two or more memory media; such media may reside in different locations—for example, in different computer systems that are connected over a network.

Design information 1515 may be specified using any of various appropriate computer languages, including hardware description languages such as, without limitation: VHDL, Verilog, SystemC, SystemVerilog, RHDL, M, MyHDL, etc. The format of various design information may be recognized by one or more applications executed by computing system 1540, semiconductor fabrication system 1520, or both. In some embodiments, design information may also include one or more cell libraries that specify the synthesis, layout, or both of integrated circuit 1530. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1530 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists.

Mask design data may be formatted according to graphic data system (GDSII), or any other suitable format.

Semiconductor fabrication system 1520 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1520 may also be configured to perform various testing of fabricated circuits for correct operation.

In various embodiments, integrated circuit 1530 and model 1560 are configured to operate according to a circuit design specified by design information 1515, which may include performing any of the functionality described herein. For example, integrated circuit 1530 may include any of various elements shown in FIGS. 1-8. Further, integrated circuit 1530 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1520 to fabricate integrated circuit 1530.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A system, comprising:
a plurality of integrated circuit dies, wherein a first one of the plurality of integrated circuit dies is indirectly coupled to a second one of the plurality of integrated circuit dies through a path that includes a plurality of intervening integrated circuit dies, wherein the first and second integrated circuit dies implement a type of computing resource that is not implemented on the plurality of intervening integrated circuit dies; and
a first power source that is configured to supply power to component circuits of the first and second integrated circuit dies but is not coupled to supply power to the plurality of intervening integrated circuit dies,
wherein the first and second integrated circuit dies are configured to obtain power from the first power source based on first power credits allocated for the first power source that are actively shared between the first and second integrated circuit dies, and wherein the first integrated circuit die is configured to send a set of the first power credits to the second integrated circuit die through the path without any of the set of power credits being used by the plurality of intervening integrated circuit dies to obtain power from the first power source,
wherein the plurality of intervening integrated circuit dies is configured to obtain power from a second power source based on second power credits allocated for the second power source that are distinct from the first power credits allocated for the first power source.

2. The system of claim 1, wherein the plurality of intervening integrated circuit dies is configured to share the second power credits with each other without sending the second power credits through other integrated circuit dies.

3. The system of claim 1, wherein the second power source is configured to supply power to component circuits of the first and second integrated circuit dies, wherein the first and second integrated circuit dies are configured to obtain power from the second power source based on the second power credits, and wherein the first integrated circuit die is configured to send a set of the second power credits to the second integrated circuit die through the path.

4. The system of claim 3, wherein the first and second power sources are different types of power sources.

5. The system of claim 3, wherein the first integrated circuit die is coupled to a multiplexor circuit that is configured to send, on a same set of lanes of a die-to-die interface, power credits of a first given power source before power credits of a second given power source.

6. The system of claim 3, wherein the second power source is a battery.

7. The system of claim 1, wherein the second power source is not coupled to supply power to the first and second integrated circuit dies.

8. The system of claim 1, wherein the first and second integrated circuit dies include a first type of processor but not a second type of processor, and the plurality of intervening integrated circuit dies include the second type of processor but not the first type of processor.

9. The system of claim 1, wherein the type of computing resource is a first type of processor, and the plurality of intervening integrated circuit dies includes a second type of processor that is not implemented on the first and second integrated circuit dies.

10. A method, comprising:
accessing, by a first integrated circuit die, information identifying a power budget of a first power source that is configured to supply power to the first integrated circuit die and a second integrated circuit die but is not coupled to supply power to a plurality of intervening integrated circuit dies that couple the first integrated circuit die to the second integrated circuit die, wherein power is obtainable from the first power source based on a first plurality of power credits included in the power budget;
allocating, by the first integrated circuit die, a first set of the first plurality of power credits to a set of component circuits of the first integrated circuit die; and
sending, by the first integrated circuit die, a second set of the first plurality of power credits to the second integrated circuit die through a path that includes the plurality of intervening integrated circuit dies without the plurality of intervening integrated circuit dies using the second set of power credits to obtain power from the first power source, wherein the first and second integrated circuit dies implement a type of computing resource that is not implemented on the plurality of intervening integrated circuit dies, and wherein the plurality of intervening integrated circuit dies is configured to obtain power from a second power source based on a second plurality of power credits allocated for the second power source that is distinct from the first plurality of power credits allocated for the first power source.

11. The method of claim 10, further comprising:
sending, by the first integrated circuit die, a third set of power credits to a particular one of the plurality of intervening integrated circuit dies, wherein the particular intervening integrated circuit die is configured to obtain, based on the third set of power credits, power from the second power source, wherein the second power source is configured to supply power to the first and second integrated circuit dies.

12. The method of claim 11, wherein the second set of credits is sent before the third set of credits on a same set of lanes of a die-to-die interface that connects the first integrated circuit die to the particular intervening integrated circuit die.

13. The method of claim 10, further comprising:
receiving, by the first integrated circuit die and from the second integrated circuit die, a third set of power credits for the first power source; and
allocating, by the first integrated circuit die, power to the set of component circuits of the first integrated circuit die based on the third set of power credits.

14. The method of claim 10, wherein the second power source is not coupled to supply power to the first and second integrated circuit dies.

15. The method of claim 10, wherein the first and second integrated circuit dies include central processing unit (CPU) processors but not graphics processing unit (GPU) processors while the plurality of intervening integrated circuit dies include GPU processors but not CPU processors.

16. A non-transitory computer-readable medium having stored thereon design information specifying a circuit design in a format recognizable by a fabrication system that is configured to use the design information to fabricate a hardware integrated assembly that comprises:
a plurality of integrated circuit dies, wherein a first one of the plurality of integrated circuit dies is indirectly coupled to a second one of the plurality of integrated circuit dies through a path that includes a plurality of intervening integrated circuit dies, wherein the first and second integrated circuit dies implement a type of computing resource that is not implemented on the plurality of intervening integrated circuit dies; and
a first power source that is configured to supply power to component circuits of the first and second integrated circuit dies but is not coupled to supply power to the plurality of intervening integrated circuit dies,
wherein the first integrated circuit die is configured to:
allocate, to a first set of component circuits of the first integrated circuit die, a first set of a first plurality of power credits allocated for the first power source, wherein the first set of component circuits is configured to obtain power from the first power source based on the first set of power credits; and
send, to the second integrated circuit die through the path, a second set of the first plurality of power credits, wherein the second integrated circuit die is configured to obtain power from the first power source based on the second set of power credits,
wherein the plurality of intervening integrated circuit dies is configured to obtain power from a second power source based on a second plurality of power credits allocated for the second power source that is distinct from the first plurality of power credits allocated for the first power source.

17. The medium of claim 16, wherein the first and second integrated circuit dies are not configured to utilize the second plurality of power credits to obtain power from the second power source.

18. The medium of claim 16, wherein the plurality of intervening integrated circuit dies is configured to obtain power from the second power source based on actively shared power credits of the second plurality of power credits without sending those power credits through other integrated circuit dies.

* * * * *